(12) United States Patent
Rekimoto et al.

(10) Patent No.: US 6,414,672 B2
(45) Date of Patent: *Jul. 2, 2002

(54) INFORMATION INPUT APPARATUS

(75) Inventors: Junichi Rekimoto, Tokyo; Nobuyuki Matsushita, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,570

(22) Filed: Jul. 6, 1998

(30) Foreign Application Priority Data

Jul. 7, 1997 (JP) .............................. 9-180936

(51) Int. Cl.[7] ................................................ G09G 5/00
(52) U.S. Cl. ...................................... 345/173; 345/156
(58) Field of Search ................................ 345/173, 156; 353/122, 29

(56) References Cited

U.S. PATENT DOCUMENTS 5,687,297 A * 11/1997 Coonan et al. ............. 395/102
5,726,685 A * 3/1998 Kuth et al. .................. 345/173
5,736,975 A * 4/1998 Lunetta ....................... 345/173
6,008,800 A * 12/1999 Pryor ......................... 345/173

FOREIGN PATENT DOCUMENTS

EP 0 420 697 A2 * 3/1991 .......... G03G/15/00

* cited by examiner

Primary Examiner—Amare Mengistu
(74) Attorney, Agent, or Firm—Bell Boyd & Lloyd LLC

(57) ABSTRACT

There are provided an infrared LED panel for always applying infrared light to the back surface of a semi-transparent screen, a CCD camera for capturing only infrared light coming from the semi-transparent screen, and a projector for projecting an image onto the semi-transparent screen (with light not including infrared light). When a user performs a manipulation on the front side of the semi-transparent screen, the quantity of reflected infrared light varies. A control device picks up a variation in reflection light quantity as detection image information based on an imaging signal of the CCD camera. Further, in accordance with manipulation information that is obtained based on the detection image information, the control device executes controls necessary for, for instance, switching of an interface image to be displayed on the semi-transparent screen. A manipulation method may be in such a form as to cause a variation in detection image information through reflection of infrared light. Interactive input/output with various manipulation methods is thus enabled.

17 Claims, 22 Drawing Sheets

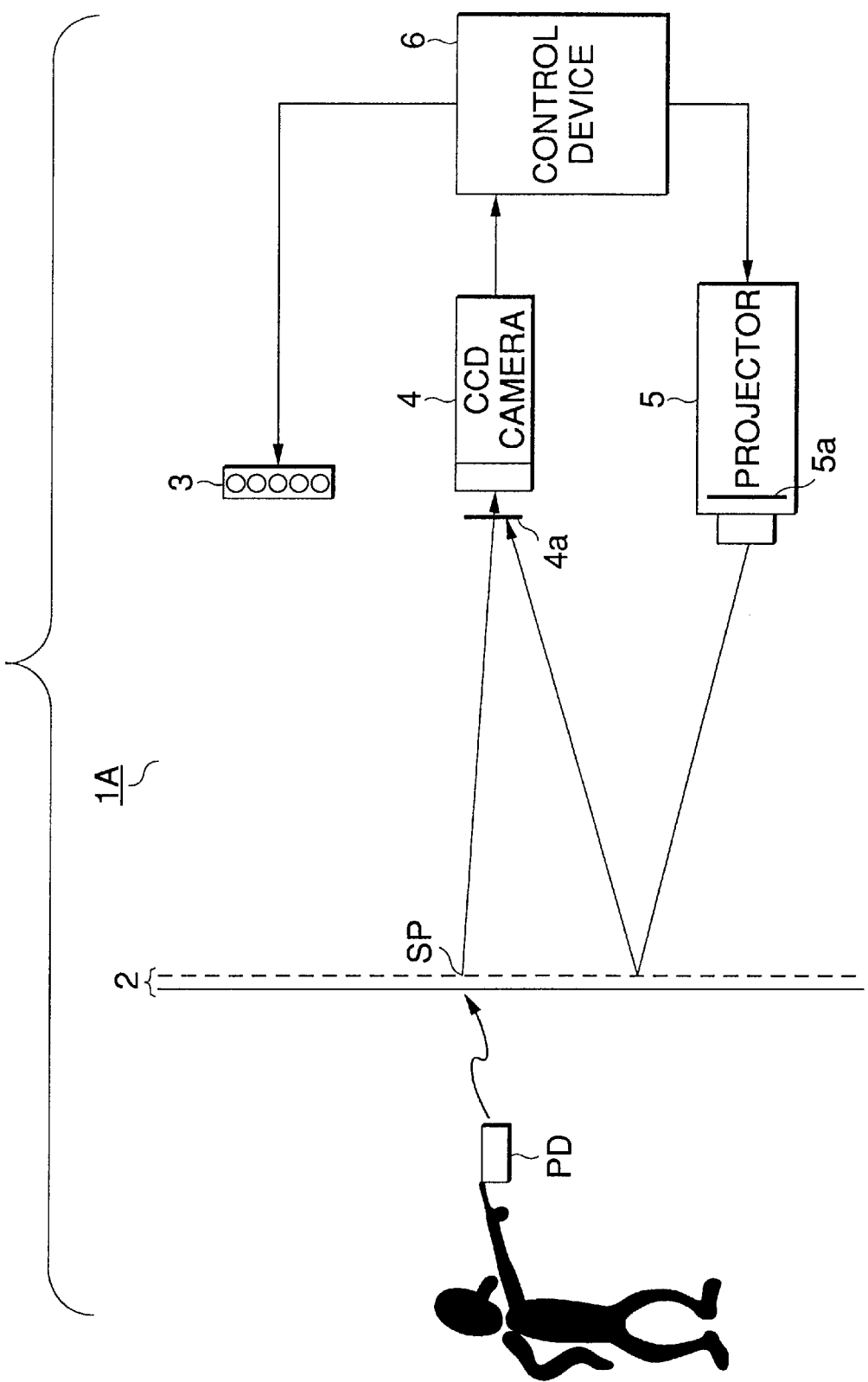

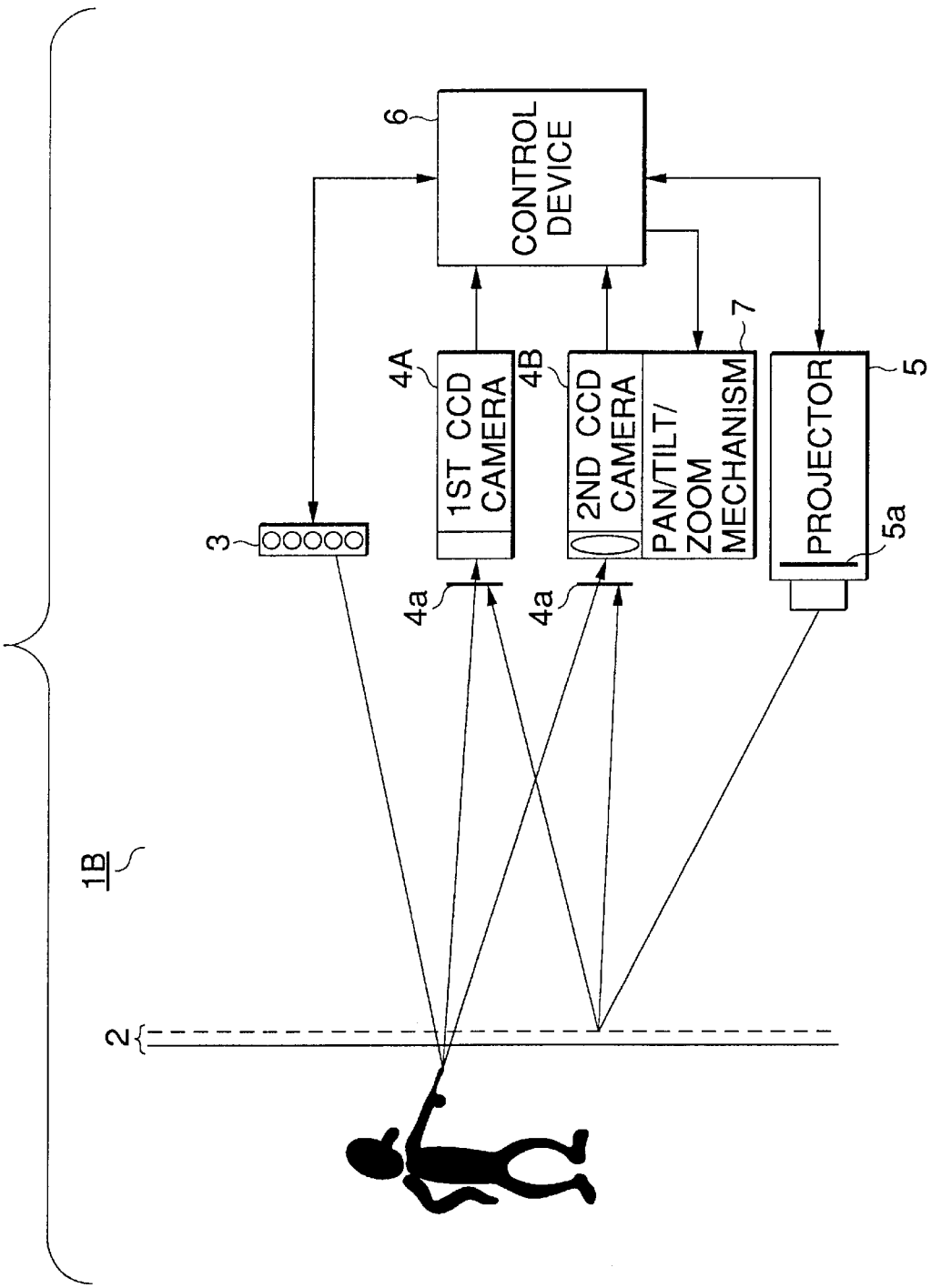

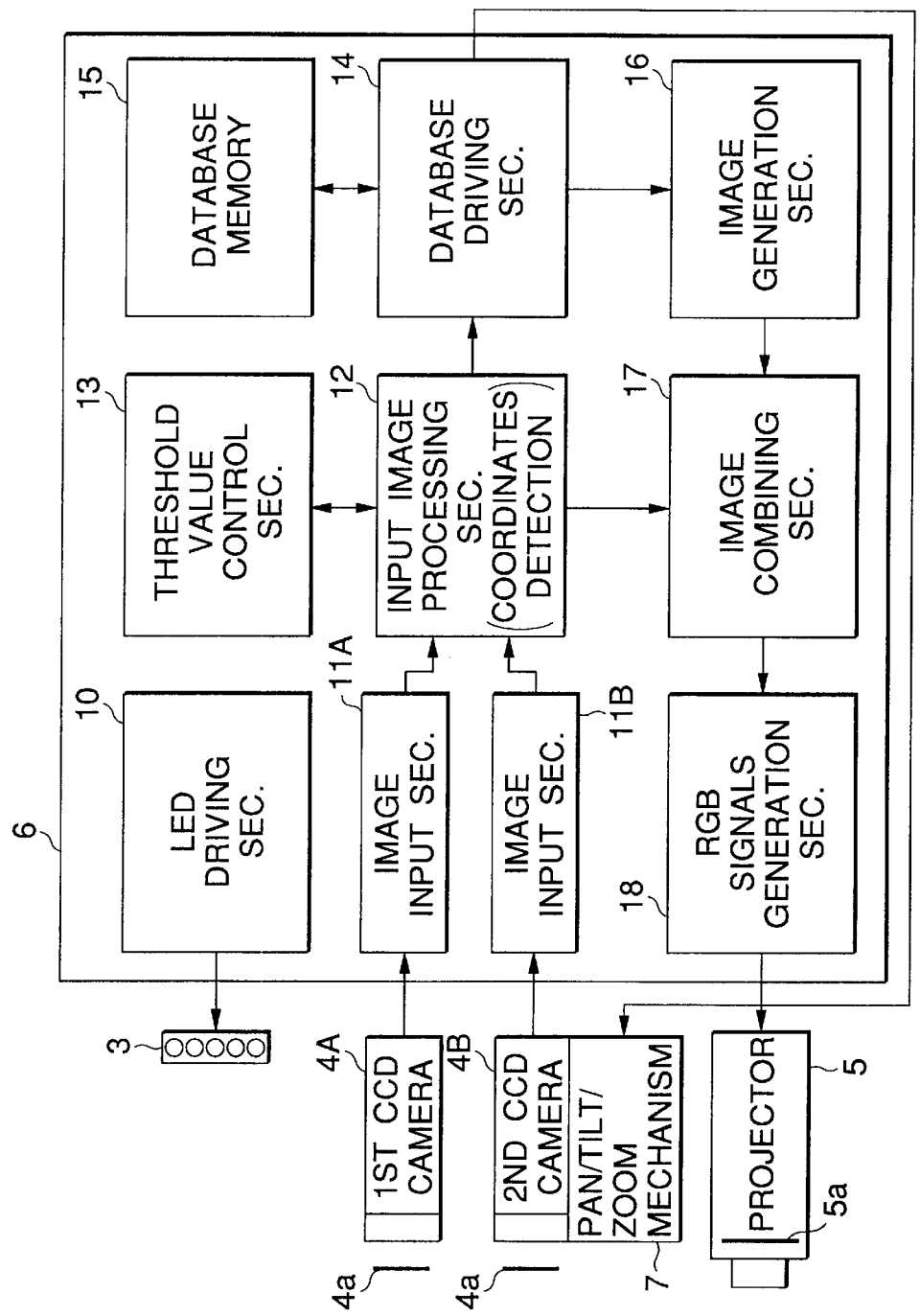

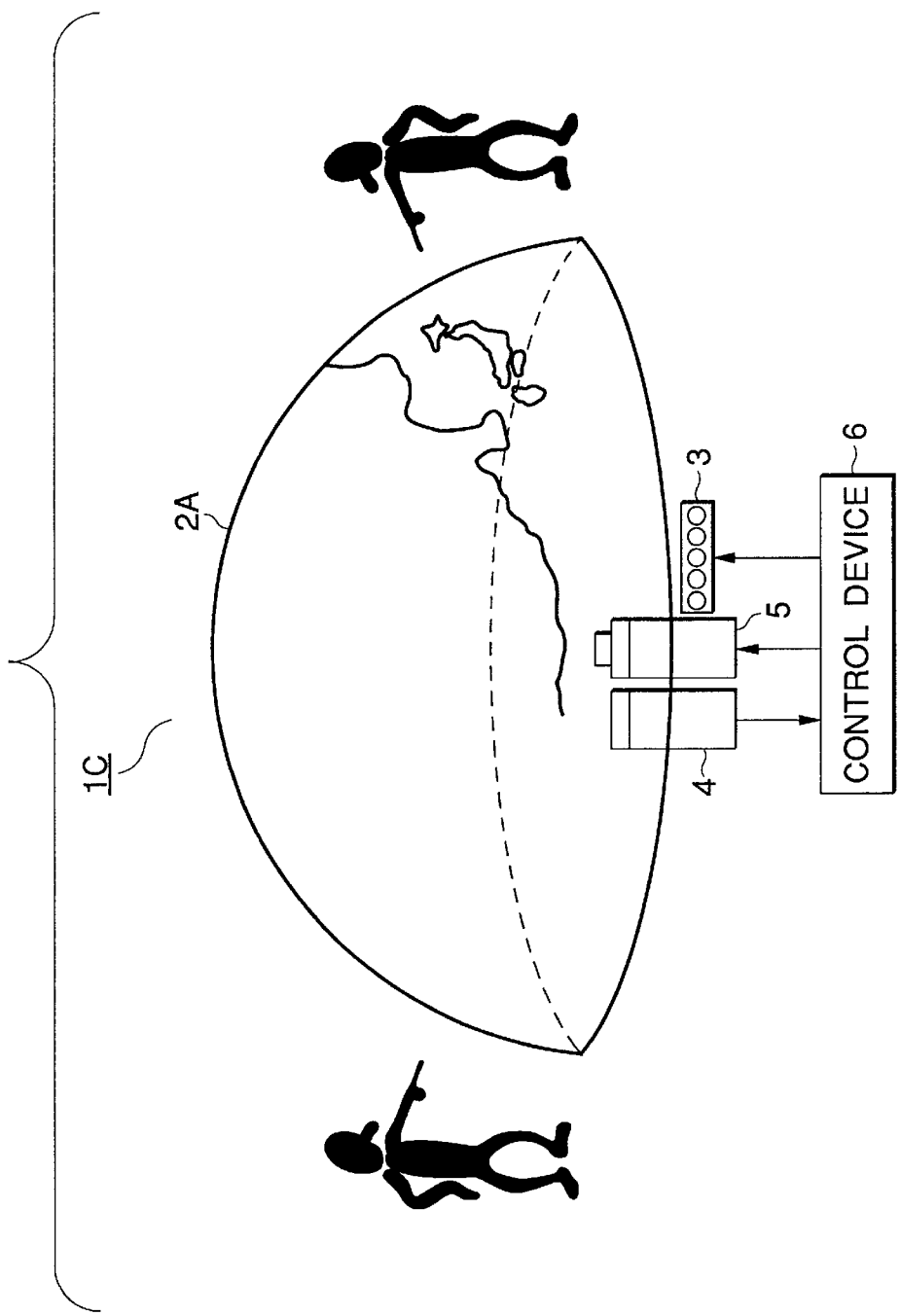

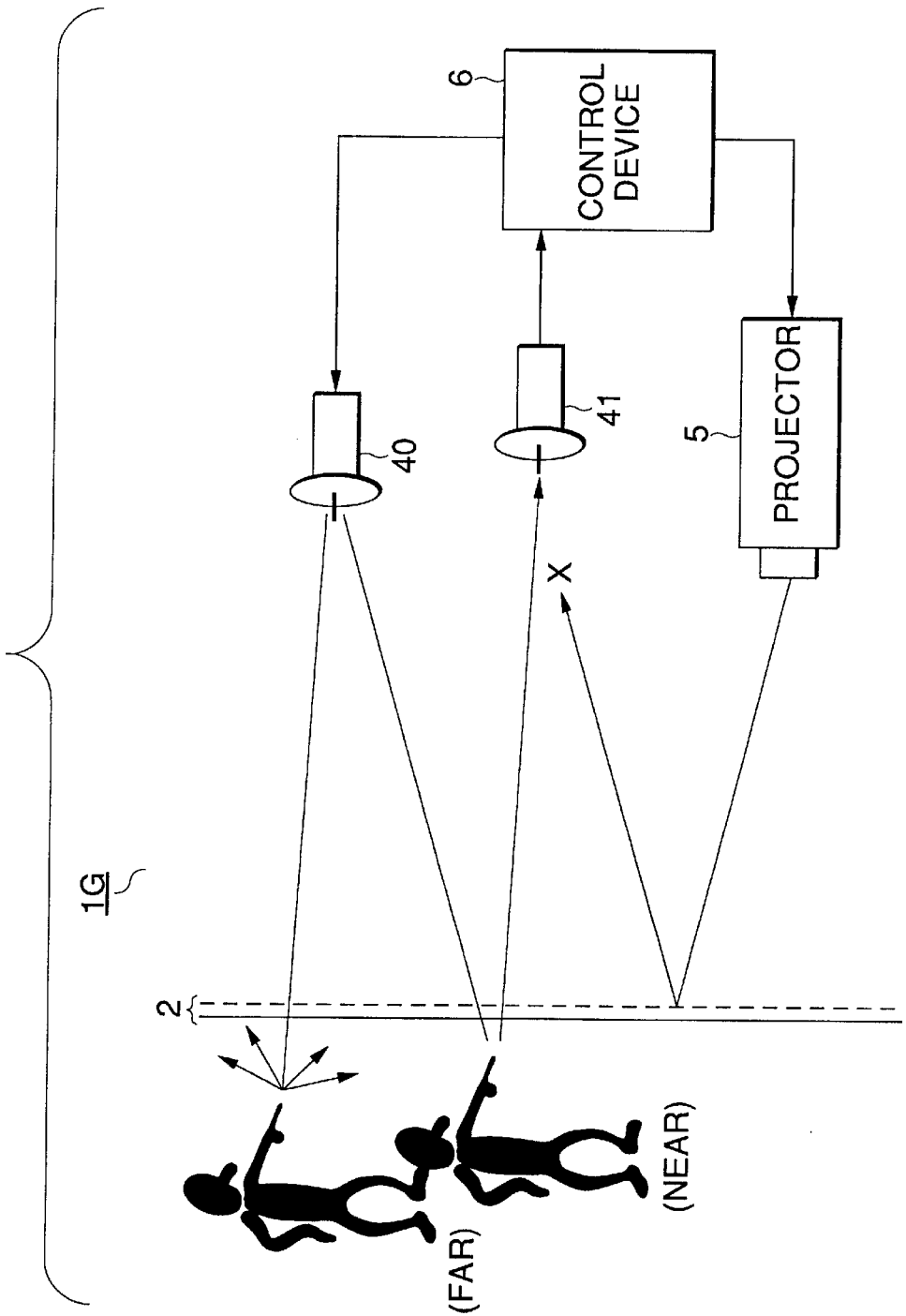

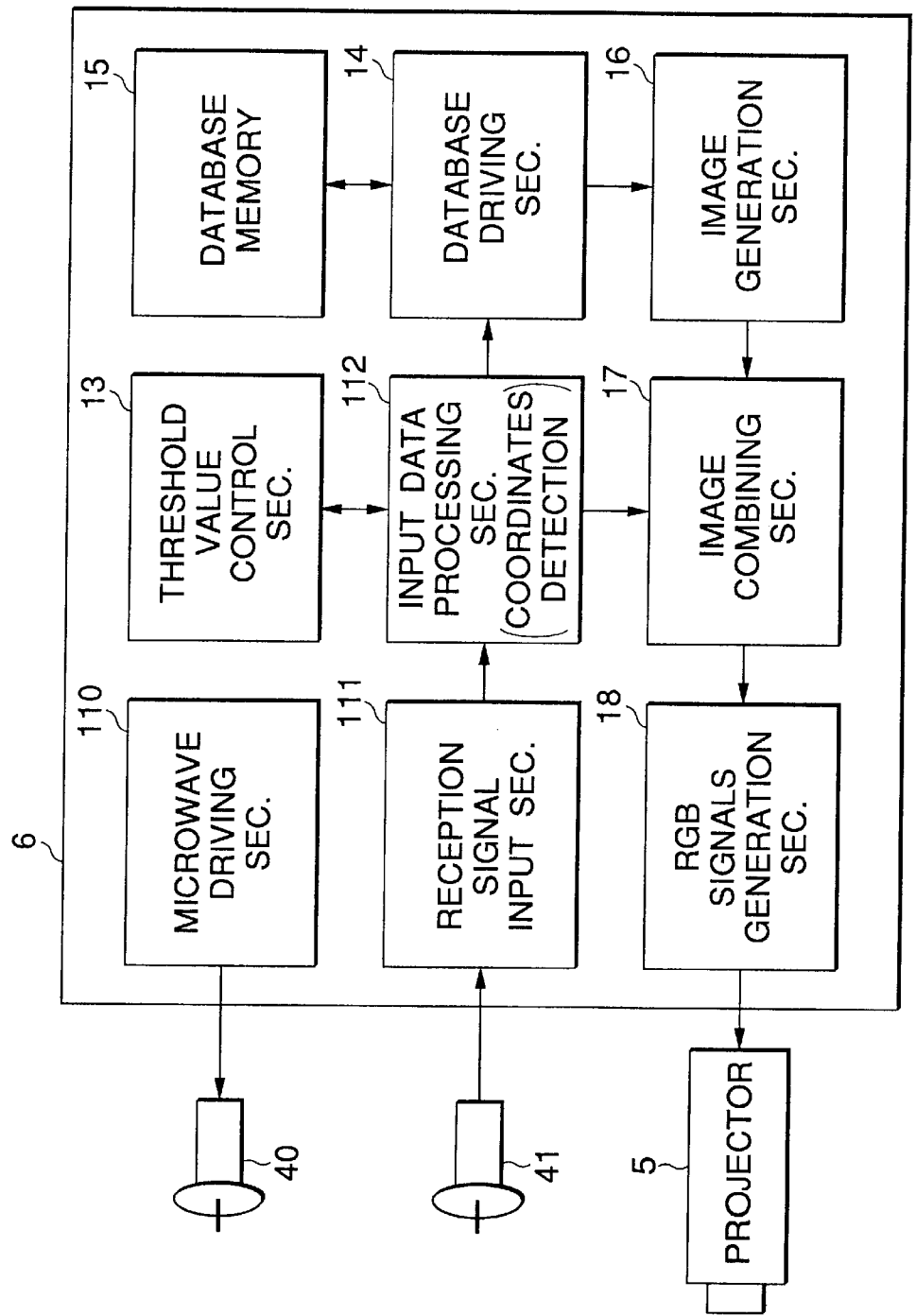

INFORMATION INPUT APPARATUS

BACKGROUND OF THE INVENTION

The present invention relates to an information input apparatus suitably used for, for instance, interactive input/output.

Computer apparatuses and the like commonly employ, under various application programs etc., what is called interactive input/output form in which the computer apparatus side presents, in the forms of a display, a prescribed response to a user's manipulation.

For example, the touch panel is commonly known as one of input devices that are used for the above type of interactive input/output. With the touch panel, a user can perform a desired manipulation by sliding, for instance, his finger in an arbitrary direction while touching the panel.

The projection display is also known which functions as a computerized white board. In this projection display, for example, a user can perform a manipulation on the white board by using a dedicated infrared-light-emitting pen.

Further, the apparatus called "Video Place" as an apparatus that is intended to provide interactive effect. Video Place is an artistic apparatus using a video camera, for instance. For example, a viewer of a Video Place apparatus causes the video camera to photograph his hand or some other part of his body as a silhouette. The viewer can enjoy a reaction or a change in an image that is displayed on a monitor device and that is a combination of an image photographed above and some other image by moving his hand or some other part of his body freely while watching the image on the monitor device.

Incidentally, to realize a more advanced interactive input/output environment, the above-described, currently available input devices have the following limits.

In the case of the touch panel, the pointing manipulation is generally limited to one using a finger. No manipulation can be performed in a space in front of the touch panel; it is necessary to cause a physical manipulation body such as a finger to contact the manipulation surface. Further, being relatively expensive, the touch panel is not appropriate for a large-size manipulation panel.

In the case of the projection display functioning as a computerized white board, although the manipulation screen can easily be increased in size, a special pointing device such as an infrared-light-emitting pen is needed as described above.

In the case of Video Place, since an interactive manipulation is realized by using a silhouette of a hand or a human body, the input/output interface is indirect and the functionality is insufficient to enable a direct manipulation.

SUMMARY OF THE INVENTION

An object of the present invention is to provide a more advanced or enhanced interactive input/output environment.

To attain the above object, the invention provides an information input apparatus comprising a semi-transparent screen that functions as an operator input manipulation surface; pickup means for picking up an input manipulation of an operator on the semi-transparent screen by capturing only light or electromagnetic waves in a predetermined wavelength range that comes through the semi-transparent screen, to thereby produce a pickup signal; and control processing means for generating detection image information corresponding to the input manipulation of the operator based on the pickup information, and for executing a control process based on input manipulation information that is recognized based on the detection image information.

In the information input apparatus having the above basic configuration, a physical object, for instance, that has approached the semi-transparent screen causes a variation in the state of light or electromagnetic waves entering the pickup means. In the invention, such a state variation in light or electromagnetic waves is picked up as image information. The thus-obtained image information is used as manipulation information, and a necessary control process can be executed in accordance with the manipulation information. That is, interactive input/output can be realized by producing input information by a manipulation in which some physical object capable of causing a variation in the state of light or electromagnetic waves in a predetermined wavelength range to be captured by the pickup means is made close to the semi-transparent screen or moved in its vicinity. In the invention, what functions as a manipulation panel is merely a semi-transparent screen. Since the semi-transparent screen can be formed, for instance, by combining a material for forming a transparent screen and a material for forming a semi-transparent screen, a large-size semi-transparent screen can easily be formed.

Where the above configuration is further provided with irradiating means for always irradiating the semi-transparent screen with light or electromagnetic waves to be captured by the pickup means, a medium for detection of information on a manipulation that is performed on the semi-transparent screen can be obtained easily.

The above configuration may further be provided with projection display means so that it can project, onto the semi-transparent screen, an image of visible light in an wavelength range excluding the wavelength range of light or electromagnetic waves to be captured by the pickup means, wherein the control processing means executes, as the above-mentioned control process, a display image generation process for causing the projection display means to project a display image and a control on the projection display means.

In this case, since the semi-transparent screen has a function of a display panel as well as a function of a manipulation panel, an interactive response in response to a manipulation that has been performed on the semi-transparent screen can be displayed as an image on the same semi-transparent screen.

BRIEF DESCRIPTION OF THE DRAWINGS

FIG. 11 conceptually shows an example configuration of an interactive display system according to a second embodiment of the invention;

FIG. 12 conceptually shows an example configuration of an interactive display system according to a third embodiment of the invention;

FIG. 13 shows the internal configuration of a control device provided in the interactive display system according to the third embodiment;

FIG. 15 conceptually shows an example configuration of an interactive display system according to a fourth embodiment of the invention;

FIG. 22 conceptually shows an example configuration of an interactive display system according to an eighth embodiment of the invention; and FIG. 23 shows the internal configuration of a control device provided in the interactive display system according to the eighth embodiment.

DETAILED DESCRIPTION OF THE PREFERRED EMBODIMENTS

Information input apparatuses according to embodiments of the present invention will be hereinafter described.

Embodiment 1

A first embodiment of the invention will be described with reference to FIGS. 1–10.

Figure 1:
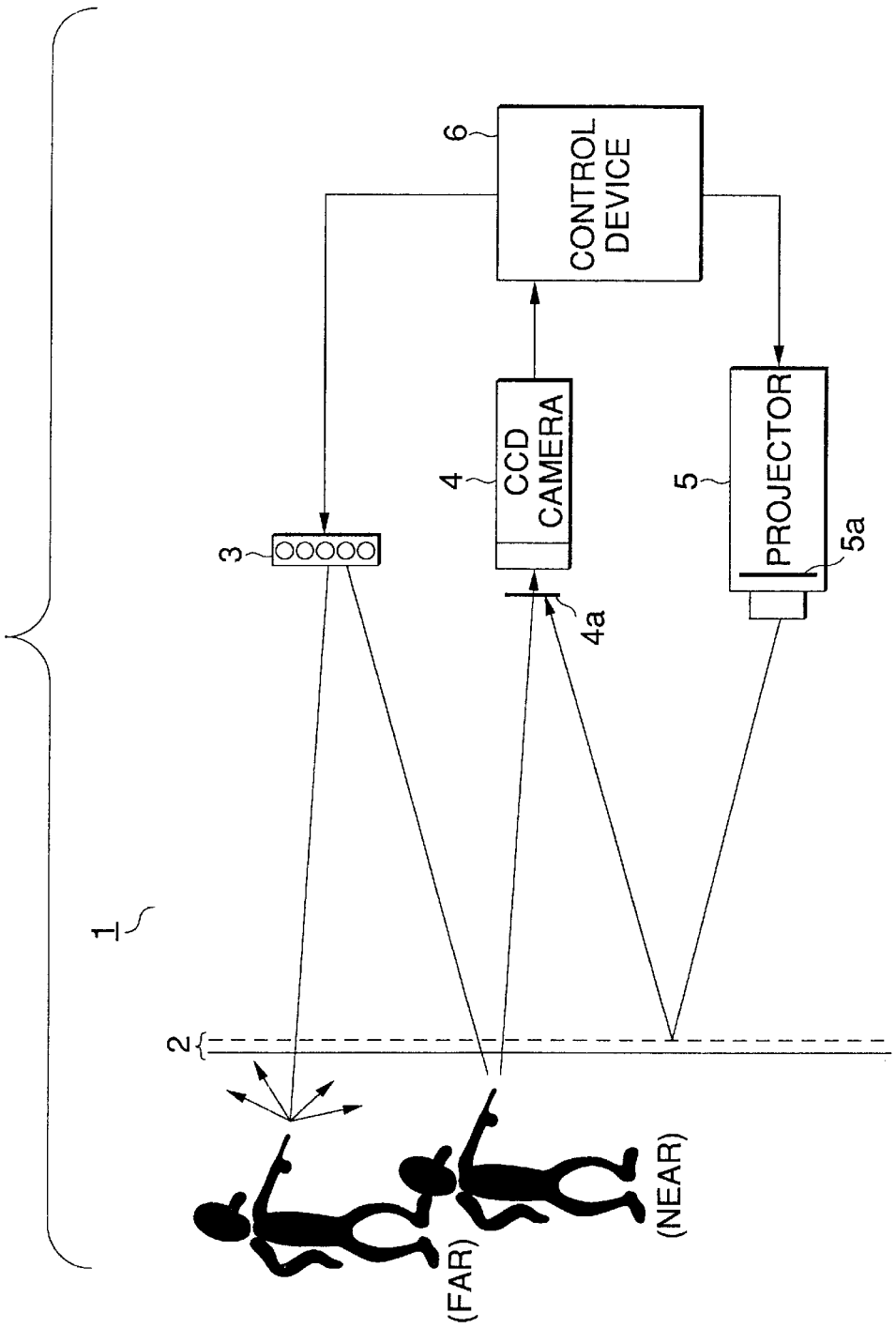
FIG. 1 conceptually shows an example configuration of an interactive display system according to a first embodiment of the present invention.

FIG. 1 conceptually shows an example configuration of an interactive display system having an information input apparatus according to the first embodiment of the invention.

An interactive display system 1 according to this embodiment is composed of a semi-transparent screen 2, an infrared light-emitting diode (LED) panel 3, a CCD (charge-coupled device) camera 4, a projector 5, and a control device 6. The infrared LED camera 3, the CCD camera 4, and the projector 5 are provided on the back side of the semi-transparent screen 2.

For example, the semi-transparent screen 2 is formed by bonding a semi-transparent film that looks like tracing paper to a transparent glass plate or by using a member having transparency such as a frosted glass. As described later, the semi-transparent screen 2 has functions of both of a manipulation panel and a display panel in the interactive display system 1.

For example, the infrared LED panel 3 is constructed in such a manner that many infrared LEDs are arranged collectively with respect to a panel surface. The infrared LED panel 3 is so disposed that infrared beams emitted from the respective infrared LEDs are applied to the entire back surface of the semi-transparent screen 2. The infrared LEDs are driven by the control device 6 so as to always emit infrared light.

The infrared LEDs of the infrared LED panel 3 may be provided in a number that is enough for infrared light beams emitted therefrom to illuminate the entire semi-transparent screen 2. As described later, image information reflected from the semi-transparent screen 2 is obtained based on a difference obtained by subtracting a current infrared image level from an initial infrared image level. Therefore, it is not necessary that the quantity of infrared light applied to the semi-transparent screen 2 be uniform over the entire screen 2. Therefore, the infrared LED panel 3 may be much smaller than the semi-transparent screen 2.

The CCD camera 4 is a camera device using a CCD as an imaging device and functions as a pickup means for picking up an input manipulation of an operator on the semi-transparent screen 2. The CCD camera 4 is provided to recognize, as image information, a manipulation that is performed on the semi-transparent screen 2 by photographing only the infrared component of an image formed on the semi-transparent screen 2. To this end, an infrared transmission filter 4a that transmits only a light component in an infrared wavelength band is provided in the optical system of the CCD camera 4. The position of the CCD camera 4 is so set that the entire semi-transparent screen 2 is included in its photographing range.

The projector 5 projects visible image light onto the back surface of the semi-transparent screen 2 based on image information that is supplied from the control device 6. For example, a user can see, from the front side of the semi-transparent screen 2, an image projected on the semi-transparent screen 2 by the projector 5. The optical system of the projector 5 includes an infrared cutoff filter 5a for cutting off an infrared component of light, as a result of which the light coming from an image that is projected on the semi-transparent screen 2 does not include an infrared component. Therefore, the CCD camera 4 does not detect a projection image of the projector 5.

Incorporating, for instance, a microcomputer, the control device 6 captures image information (video data) from an imaging signal that is supplied from the CCD camera 4 and obtains manipulation information from the image information. Based on the manipulation information, the control device 6 performs a display control for an image to be displayed on the semi-transparent screen 2 by the projector, and other necessary controls. Further, the control device 6 drives, for light emission, the infrared LEDs of the infrared LED panel 3.

The positions of the infrared LED panel 3, the CCD camera 4, and the projector 5 may be so set that each of those devices can play its role satisfactorily.

Figure 2:
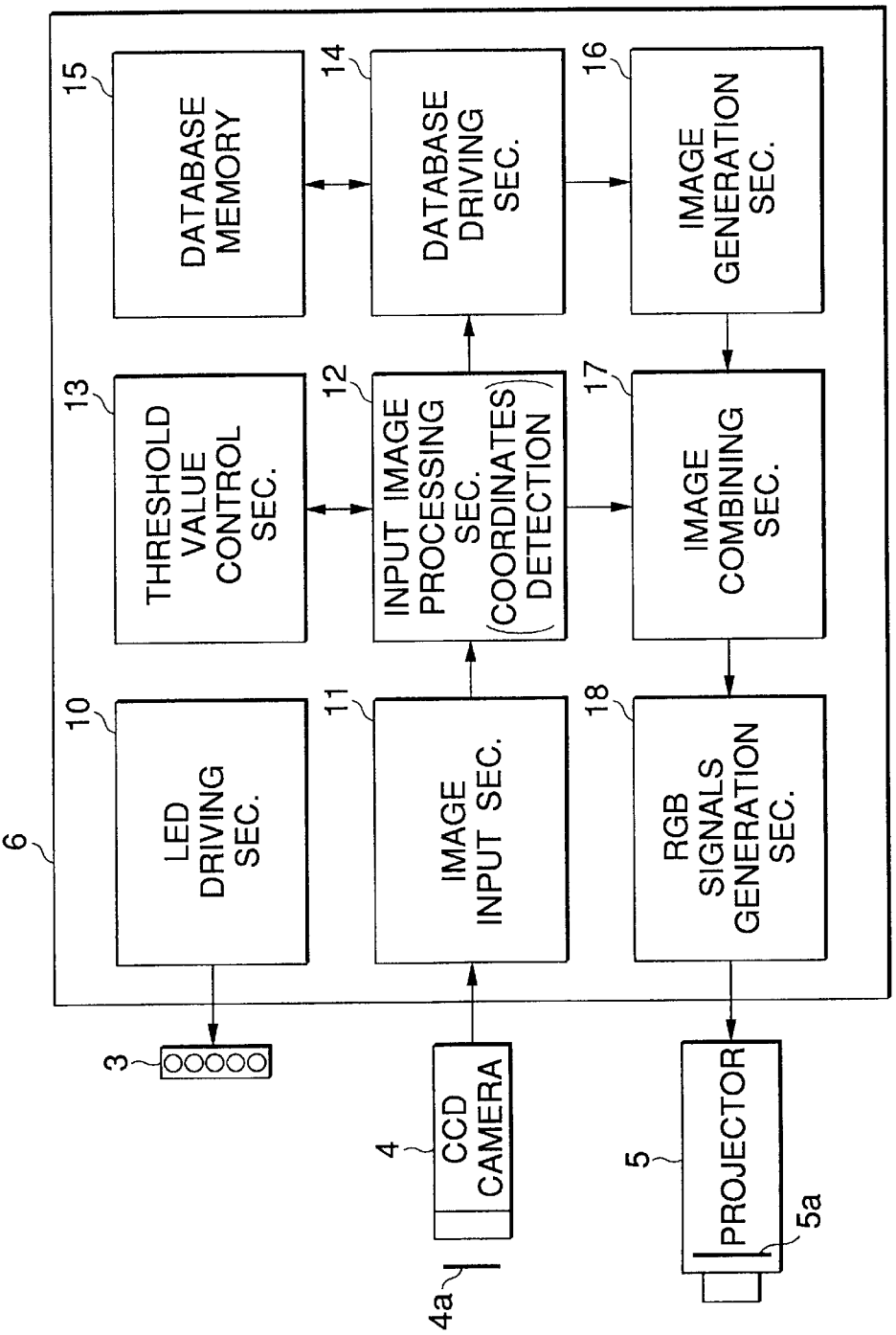
FIG. 2 shows an internal configuration of a control device that is provided in the interactive display system according to the first embodiment.

FIG. 2 is a block diagram showing an example of an internal configuration of the control device 6. In the control device 6 shown in FIG. 2, an LED driving section 10 is to drive, for light emission, the infrared LEDs of the infrared LED panel 3.

An image input section 11 generates a video signal (video information) by performing prescribed signal processing on an imaging signal that has been produced by the CCD camera 4 based on infrared light coming from the semi-transparent screen 2, and supplies it to an input image processing section 12.

For example, the input image processing section 12 converts the video signal that is supplied from the image input section 11 into video signal data (digital signal).

The input image processing section 12 picks up information of a manipulation that has been performed on the semi-transparent screen 2 by executing a necessary analyzing process etc. by using "image information" (for example, frame-by-frame video data) that is obtained based on the video signal data. For example, the manipulation information that is obtained based on the image information is the position (coordinates) on an image of a manipulation body that is performing a manipulation on the semi-transparent screen 2 or the signal level of an image. The manipulation information is transmitted to a database driving section 14. The video signal data can be supplied to an image combining section 17.

An threshold value control section 13 sets a threshold value that is necessary for a process to be executed on manipulation information in the input image processing section 12, and transmits it to the input image processing section 12. The input image processing section 12 generates manipulation information by executing a necessary process such as an analysis on image information by using the threshold value that has been set by the threshold value control section 13. In this embodiment, a current image state (detection image information) of the semi-transparent screen 2 is obtained by calculating a frame difference of input image data (described later). Such information as a reference value (reference image input level) to be used the frame difference calculation is stored in the threshold value control section 13 (described later).

The database driving section 14 captures manipulation information generated by the input image processing section 12, and executes, when necessary, a necessary process based on the manipulation information. Program data necessary for control processes to be executed by the database driving section 14 is stored in a database memory 15. The database driving section 14 executes the necessary control process based on the program data stored in the database memory 15.

Controlled by the database driving section 14, an image generation section 16 generates necessary image data (video signal data (digital data)) and outputs it to an image combining section 17.

If necessary, the image combining section 17 combines video signal data that is supplied from the input image processing section 12 with video signal data that is supplied from the image generation section 16, and outputs resulting data to an RGB signals generation section 18.

The RGB signals generation section 18 converts the video signal data that is supplied from the image combining section 17 into, for instance, analog RGB signals, and outputs those to the projector 5. As a result, image light carrying a video signal that reflects a response to a manipulation that has been performed on the semi-transparent screen 2 is applied to the semi-transparent screen 2 from the projector 5.

Next, a description will be made of a method of detecting manipulation information in the above-configured interactive display system 1 according to the embodiment.

As described above, infrared light is applied from the infrared LED panel 3 to the entire semi-transparent screen 2 (see FIG. 1) from the back side. Because the screen 2 is semi-transparent, not all of the infrared light passes through the semi-transparent screen 2 and a certain part of it is reflected by the semi-transparent screen 2.

In this embodiment, the initial levels of video signal data that are obtained by photographing infrared light that is reflected by the semi-transparent screen 2 with the CCD camera 4 in a state that no manipulation is performed on the semi-transparent screen 2 are stored as "reference input image levels." The reference input image levels may be obtained by detecting signal levels of the respective pixels of, for instance, one frame by using input video signal data. This detection is performed by the input image processing section 12. The information of the reference input image levels thus detected is transmitted to the threshold value control section 13 and stored there.

Figure 3:
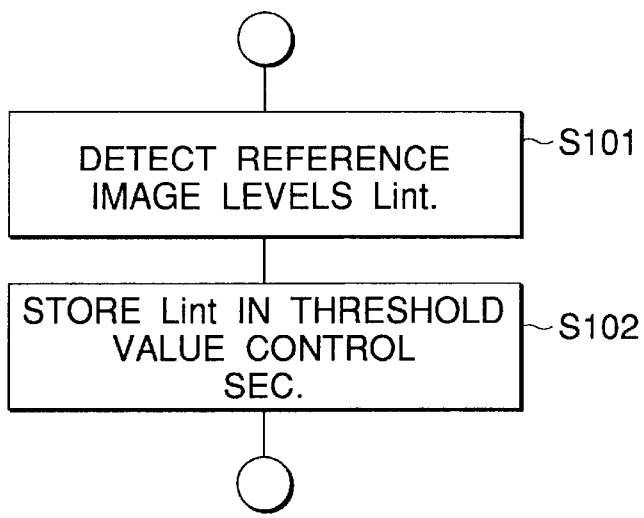
FIG. 3 is a flowchart showing a process of detecting and holding reference input image levels.

FIG. 3 is a flowchart showing an example process of detecting the reference input image level. As shown in FIG. 3, first, at step S101, the input image processing section 12 detects signal levels of the respective pixels by using 1-frame image data that is obtained from a video signal that is supplied from the image input section 11 and employs detection results as reference input image levels Lint. Specifically, luminous signal component levels of the respective pixels may be detected and employed as the reference input image levels Lint.

At the subsequent step S102, the reference input image levels Lint are transmitted to the threshold value control section 13 and stored there.

The process of FIG. 3 of detecting the reference input image levels Lint and storing those in the threshold value control section 13 may be executed at the time of turning on the power of the interactive display system, or the reference input image levels Lint may be updated based on a user's instruction when necessary.

In a state that the information of the reference input image levels Lint is held in the above manner, image information to be handled as manipulation information is obtained in the following manner.

Figure 4:
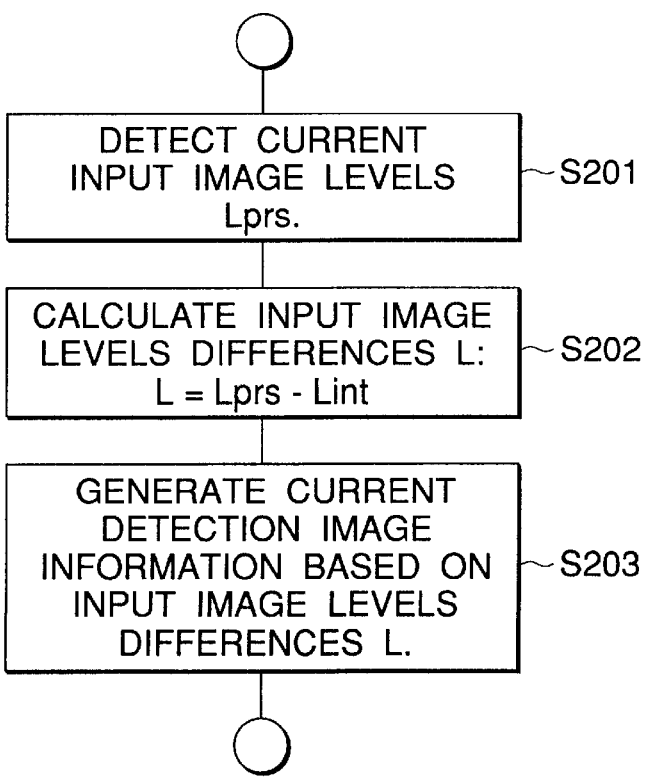
FIG. 4 is a flowchart showing a process of generating detection image information.

FIG. 4 is a flowchart showing a process to be executed by the input image processing section 12 to obtain image information (hereinafter especially referred to as "detection image information") as a basis of manipulation information. In this process, the input image processing section 12 necessarily detects current input image levels Lprs at step S201. The input image levels Lprs are information obtained by detecting signal levels of the respective pixels of frame-by-frame image data that is obtained by photographing a current infrared image on the semi-transparent screen 2 with the CCD camera 4.

Then, at step S202, the input image processing section 12 calculates input image level differences L by subtracting the reference input image levels Lint from the current input image levels Lprs (L=Lprs−Lint). Specifically, the input image level differences L are obtained by subtracting a reference input image level Lint from a current input image level Lprs for each pixel at the same position. Therefore, the signal level differences are always obtained as the input image level differences L for the respective pixels by subtracting the reference input image levels Lint from the current input image levels Lprs. At step S203, the input image processing section 12 generates current detection image information (i.e., frame-by-frame video data including pixel-based level information) based on the input image level differences L.

The above operation of obtaining the detection image information will now be described in connection with actual motion of a user on the front side of the semi-transparent screen 2. For example, a user performs a manipulation on the front side of the semi-transparent screen 2 by using some object that reflects infrared light. To simplify the description, it is assumed that the user uses his finger or body.

When the user is located on the front side of the semi-transparent screen 2 at a position far from it (see FIG. 1), the amount of infrared light that is passed through the semi-transparent screen 2 and then reflected by the user's body is small; that is, most of the infrared light that has passed through the semi-transparent screen 2 does not return to the back side of the semi-transparent screen 2. At this time, the current input image levels Lprs are approximately equal to the reference input image levels Lint, and hence the input image level differences L detected by the input image processing section 12 are approximately equal to 0. Therefore, the detection image information that is generated based on the input image level differences L remains approximately the same as in the initial state and has almost no variation component.

If the user slowly approaches the semi-transparent screen 2 starting from the above state, the amount of infrared light that is passed through the semi-transparent screen 2, reflected by the user's body, and again passed through the semi-transparent screen 2 to reach its back side gradually increases. The input image processing section 12 detects this state as a state in which the current input image levels Lprs minus the initial input image levels Lint gradually increase in an image portion corresponding to the user's body. Accordingly, the figure of the user approaching the semi-transparent screen 2 is captured increasingly clearly as the detection image information in accordance with the calculated input image level differences L.

In a state that the user's body is very close to the semi-transparent screen 2 (for instance, distant from the semi-transparent screen 2 by 30 cm or less though this value depends on the setting of the threshold value), most of the infrared light reflected by the human body passes through the semi-transparent screen 2 and reaches its back side. In this state, detection image information reflecting a clear body shape is generated.

Now assume another case in which the user whose body is somewhat distant from the semi-transparent screen 2 places, for instance, his finger at a position very close to the semi-transparent screen 2.

In this state, the user's finger that is very close to the semi-transparent screen 2 reflects infrared light at a higher rate than the other part of the body. Therefore, the input image processing section 12 generates such image information that the level is high in an image region corresponding to the user's finger and decreases with the distance from the semi-transparent screen 2 in an image region corresponding to the user's body which region is part of the background. An image portion corresponding to only the user's finger can easily be separated from the background by comparing the detection image information with the threshold value that is preset is the threshold value control section 13. Similarly, by setting a proper threshold value, it is possible to produce image information in which an image portion corresponding to only the user' body that is distant from the semi-transparent screen 2 is extracted. In this manner, a threshold value that is suitable for an actually necessary condition is set in the threshold value control section 13.

With the configuration for detecting the state on the front side of the semi-transparent screen 2 in the above manner, the following advantages are obtained when the semi-transparent screen 2 functions, for instance, as a manipulation panel for an interactive interface.

First, since in this embodiment manipulation information is produced based on an image that is obtained from the quantity of infrared light reflected from the semi-transparent screen 2, the manipulation body for performing a manipulation need not be a special pointing device and may be of any kind as long as it reflects infrared light. That is, as described above, the entire human body or a part thereof, or some other object may be used as a manipulation body without causing any problem.

In the case of the touch panel or the like, it is necessary to bring a manipulation body such as a finger into contact with the manipulation panel surface. In contrast, in this embodiment, since the position and the motion of the manipulation body are detected through reflected infrared light, it is not necessary to bring the manipulation body into contact with the semi-transparent screen 2 and a manipulation may be performed in a space in front of the semi-transparent screen 2.

Since the quantity of reflected infrared light varies with the distance of the manipulation body from the semi-transparent screen 2 as described above, it is possible to use the distance of the manipulation body from the semi-transparent screen 2 as manipulation information.

As described above, the semi-transparent screen 2 can be a simple means constructed, for example, by combining a transparent glass plate and a semi-transparent thin film such as tracing paper or using such a glass plate as a fronted glass. In particular, since no driving circuit or the like dedicated to the panel is necessary, the semi-transparent screen 2 can easily be increased in size with a small cost increase. This is much different than in the touch panel which cannot be increased in size easily.

Since manipulation information can be produced based on an image that is obtained from infrared light that is reflected from the semi-transparent screen 2, a plurality of manipulation bodies can be recognized at the same time to perform necessary controls as long as their images can be recognized. That is, a plurality of different manipulation bodies can be manipulated at the same time. This is very useful when the semi-transparent screen 2 is of a large size because different kinds of manipulations can be performed at the same time by using various regions of the semi-transparent screen 2.

Further, since the semi-transparent screen 2 also functions as an image display panel, a direct manipulation can be realized easily. For example, as described later, a configuration is possible in which a menu picture or the like on which a manipulation is to be performed is displayed and a user is allowed to perform a manipulation on the menu picture with his finger, for instance.

As described above, the interactive display system according to this embodiment provides many possible ways of inputting manipulation information and hence enables easy construction of interactive input/output environments that could not be realized conventionally.

Next, application examples of the above-configured interactive display system 1 according to this embodiment will be described with reference to FIGS. 5–9.

Figure 5:
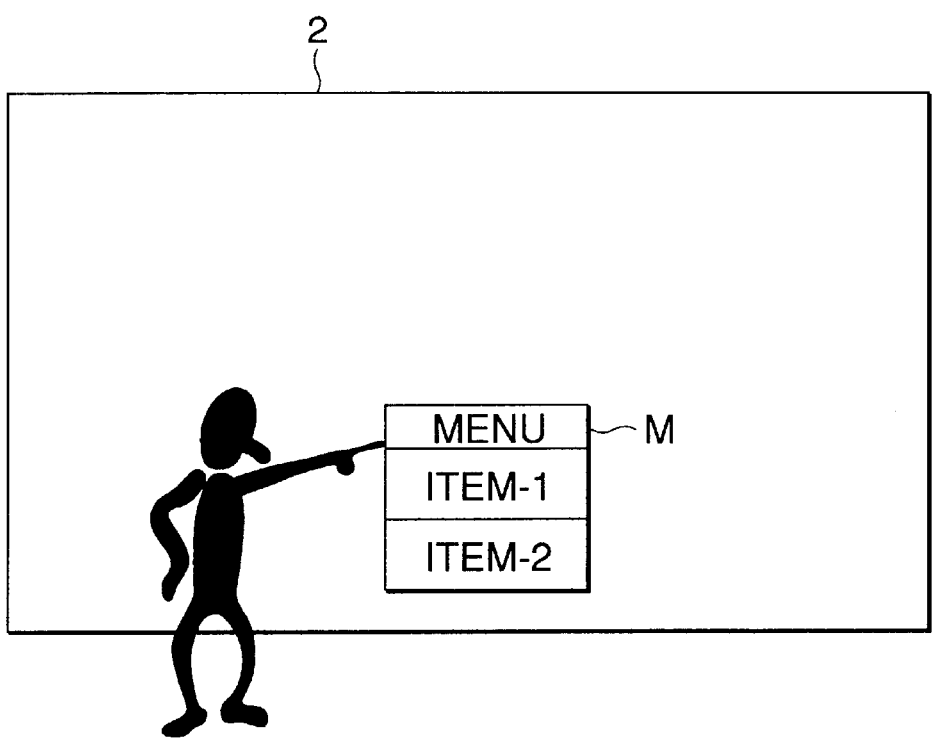
FIG. 5 illustrates a first application example of the interactive display according to the first embodiment.

FIG. 5 shows a first application example of the interactive display system 1 according to this embodiment in which a menu manipulation is performed. FIG. 5 shows a state in which the semi-transparent screen 2 is viewed from the front side.

When a user approaches the front surface of the semi-transparent screen 2 as shown in FIG. 5, first the control device 6 of the interactive display system 1 recognizes the position on the semi-transparent screen 2 corresponding to the user who is located close to the semi-transparent screen 2 based on detection image information that is obtained in this state. Then, as shown in FIG. 5, a menu picture M is displayed at the position on the semi-transparent screen 2 corresponding to the user. Naturally the menu picture M is projected on the semi-transparent screen 2 by the projector 5.

Assume that in the state that the menu picture M is displayed on the semi-transparent screen 2 at the position close to the user, he designates, for instance, with his finger, an arbitrary region of the menu picture M where a manipulation item is displayed. At this time, the finger tip of the user should be located at a position that is distant from the semi-transparent screen 2 by about 3–30 cm.

As a result, an indication display indicating the selection of the region of the manipulation item designated by the user is made in the menu picture M (for instance, a cursor is located at the selected region or the selected region is emphasized in some form). A display control for this purpose is realized by detecting the coordinates of the region designated by the user from the detection image information.

In this example, a lapse of a predetermined time (for instance, several seconds) from the start of an indication display of the above kind is regarded as an enter manipulation. If the user has performed an enter manipulation, that is, if a state that some manipulation item is indication-displayed has lasted for the predetermined time or longer, a control operation corresponding to the designated manipulation item is performed. For example, depending on the designated manipulation item, a menu picture of another layer is displayed or a desired operation is performed on the interactive display system 1. If the interactive display system 1 is so configured as to be connectable to some other external apparatus and the menu picture M is for performing a manipulation control on the external apparatus, an operation of the external apparatus corresponding to the designated manipulation item is controlled.

If the user goes away from the semi-transparent screen 2 to such an extent that the distance between the user and the semi-transparent screen 2 becomes larger than a certain value, the menu picture M that has been displayed so far is erased automatically.

Figure 6:
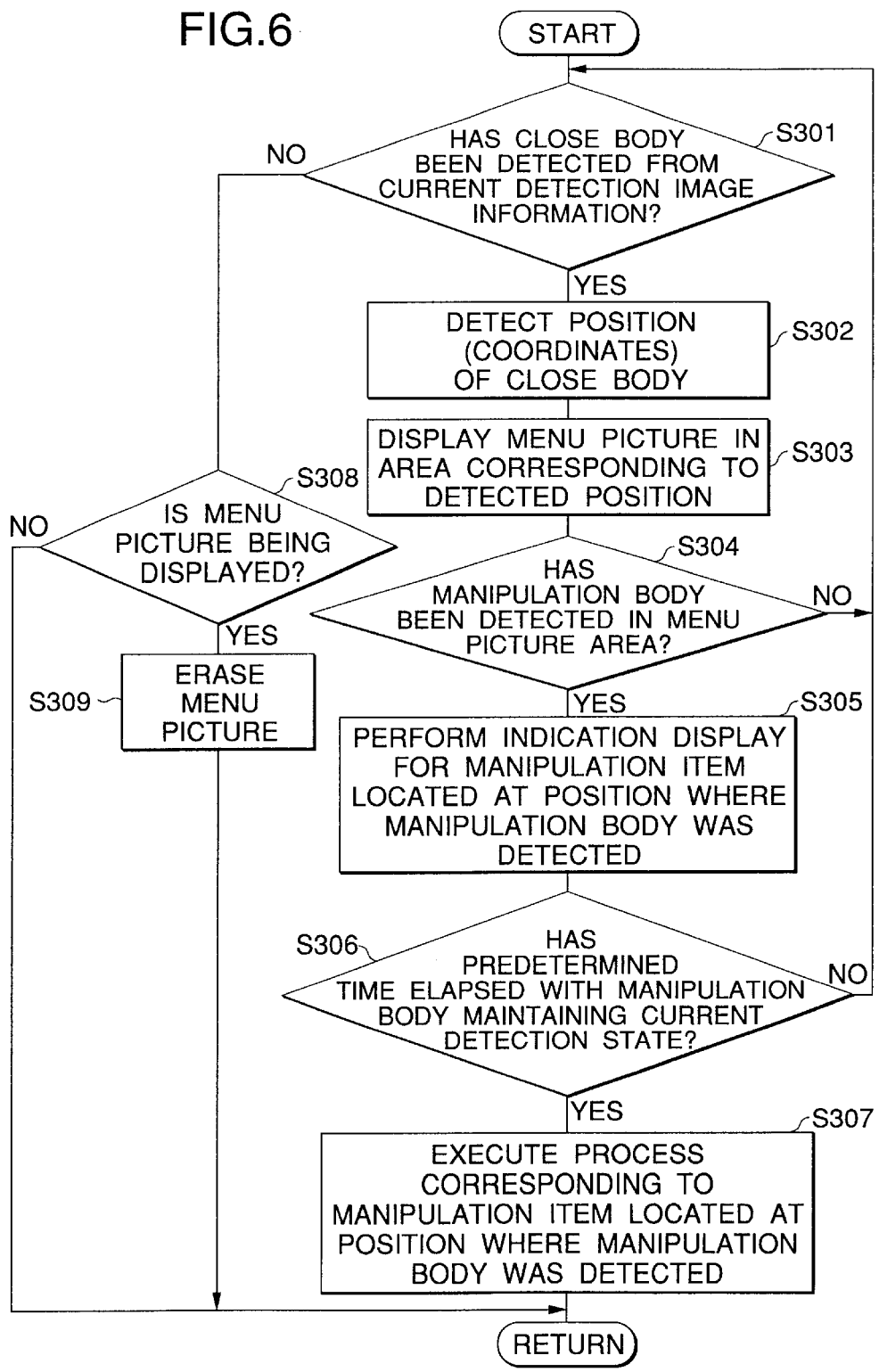
FIG. 6 is a flowchart showing a process for realizing the first application example of FIG. 5.

FIG. 6 is a flowchart showing a process of the control device 6 that corresponds to the application example of FIG. 5. This process is basically executed as the input image processing section 12 of the control device 6 recognizes manipulation information based on detection image information and the database driving section 14 performs a proper operation based on the manipulation information according to a program that is stored in the database memory 15.

In the routine of FIG. 6, first, at step S301, it is judged whether a "close body" has been detected from the current detection image information. The term "close body" means some subject of detection that is within the predetermined range from the semi-transparent screen 2 (in FIG. 5, the user's body).

A "close body" is detected by comparing, with the input image processing section 12, the detection image information with a threshold value that has been set for close body detection by the threshold value control section 13. If a value equal to or larger than the threshold value is obtained in a region of the detection image information, a detection "a close body exists" is made. If there is no region where a value equal to or larger than the threshold value is obtained, a detection "no close body exists" is made. For example, the threshold value for close body detection may be set based on an image level of a human body (user) that would usually be obtained as detection image information when he approaches the semi-transparent screen 2 to a certain extent (for instance, tens of centimeters from the screen 2).

If no close body is detected at step S301, the process goes to step S308, where it is judged whether the menu picture M is now displayed. If the menu picture M is not displayed, the process returns to the original routine (i.e., returns to step S301). If the menu picture M is displayed, the process goes to step S309, where a control process for erasing the menu picture M is executed. For example, the process of erasing the menu picture M is realized in such a manner that the database driving section 14 causes the image generation section 16 to stop a process of generating image data of the menu picture M.

On the other hand, if a close body is detected at step S301, the process goes to step S302, where the position of the close body on the semi-transparent screen 2 is detected. For example, this process is realized by detecting the coordinates of a region in the detection image information that is occupied by the close body. As for the detection of coordinates, there may be detected a prescribed one point of the region of the close body or a plurality of points that are determined according a prescribed rule. The point or points to be detected may be set arbitrarily in accordance with an actual application environment or the like.

At the subsequent step S303, a control for displaying the menu picture M in an area of the semi-transparent screen 2 corresponding to the position of the close body that was detected at step S302. In this control process, for example, the database driving section 14 causes the image generation section 16 to generate image data of a menu picture of a proper kind according to a menu picture display program that is stored in the database memory 15.

For example, the database driving section 14 causes display image data to be generated in such a manner that image data of the menu picture is mapped with a display area corresponding to the position of the close body that was detected at step S302. As a result, the menu picture M is finally projected by the projector 5 at the position on the semi-transparent screen 2 where the user's approach was detected.

After the execution of step S303, it is judged at step S304 whether a "manipulation body" has been detected in the display regions of the manipulation items of the menu picture M being displayed. The term "manipulation body" is an object (subject of detection) that is very close to the front surface of the semi-transparent screen 2 (distant by about 3–30 cm though this value depends on the setting of the threshold value). In the case of FIG. 5, the user's finger pointing the menu picture M is a subject of detection.

The process of detecting a "manipulation body" starts from detecting presence/absence of a manipulation body by comparing the image levels of the detection image information with the threshold value that is set for manipulation body detection in the threshold value control section 13. The threshold value for this purpose is set larger than the above-described threshold value for close body detection, because it is now necessary to detect an object that is very close to the front surface of the semi-transparent screen 2 by discriminating it from the background.

If a manipulation body is detected through the comparison with the threshold value, the coordinates of the position in the detection image information where the manipulation body was detected are detected. Then, it is judged whether the detection position belongs to the display area of the menu picture M in the image information, presence/absence of the manipulation body in the display area, on the semi-transparent screen 2, of the menu picture M being displayed can be detected.

Non-detection of a manipulation body in any of the display regions of the manipulation items of the menu picture M at step S304 occurs in the following cases. A first case is such that no manipulation body is detected in the detection image information (for example, the user does not pointing the semi-transparent screen 2 in a very close range). A second case is such that a manipulation body is detected in the detection image information but its detection position (coordinates) does not belong to the area in the image information corresponding to the display area of the menu picture M on the semi-transparent screen 2 (for example, the position on the semi-transparent screen 2 pointed by the user in a very close range is out of any of the regions of the manipulation items of the menu picture M). In any of the above cases, the process returns to step S301.

Where the manipulation body is limited to a hand or a finger of a human body, the manipulation body detecting process of step S304 may be as follows. The shape of a hand or a finger of a human body that will appear during a manipulation is stored in advance in the database memory 15. Presence/absence of a manipulation body is detected by comparing the information on the shape of a hand or a finger with an image shape that is obtained as detection image information and then evaluating the degree of their coincidence. In the invention, since input information is detected from image information, input information can be recognized as manipulation information based on an image shape in the detection image information.

If it is judged at step S304 that the manipulation body is detected in the display region of a manipulation item of the menu picture M, the process goes to step S305, where a control is performed so that an indication display is performed on the manipulation item of the menu picture M corresponding to the position where the manipulation body was detected. The process then goes to step S306.

Step S306 is a process of waiting for an enter manipulation. As described above, when a predetermined time has elapsed from the start of the indication display, a decision is made that an enter manipulation has been performed. Therefore, it is judged at step S306 whether the state that the manipulation body is detected in the same manner as at step S304 has lasted for the predetermined time or longer. This judgment is performed in such a manner that the input image processing section 12 monitors occurrence of a state transition in the current detection image.

If it is detected that the manipulation body has disappeared from the current detection image information or the detection position of the manipulation body in the current detection image information goes out of the display region of the manipulation item of the menu picture M where the manipulation body was detected at step S304, the process returns from step S306 to step S301. (At step S306, there may occur an event that the user changes the designating position so as to point a manipulation item of the menu picture M that is different from the one that has been designated so far. In this case, an indication display etc. will be performed on the newly designated manipulation item of the menu picture M.)

On the other hand, if it is judged at step S306 that the state that the manipulation body is detected in the same manner as at step S304 has lasted for the predetermined time or longer, the process goes to step S307 with a judgment that an enter manipulation has been done.

At step S307, a control process corresponding to the manipulation item of the menu picture M located at the position where the manipulation body was detected. This process is performed by the database driving section 14 according to a program stored in the database memory 15.

Figure 7:
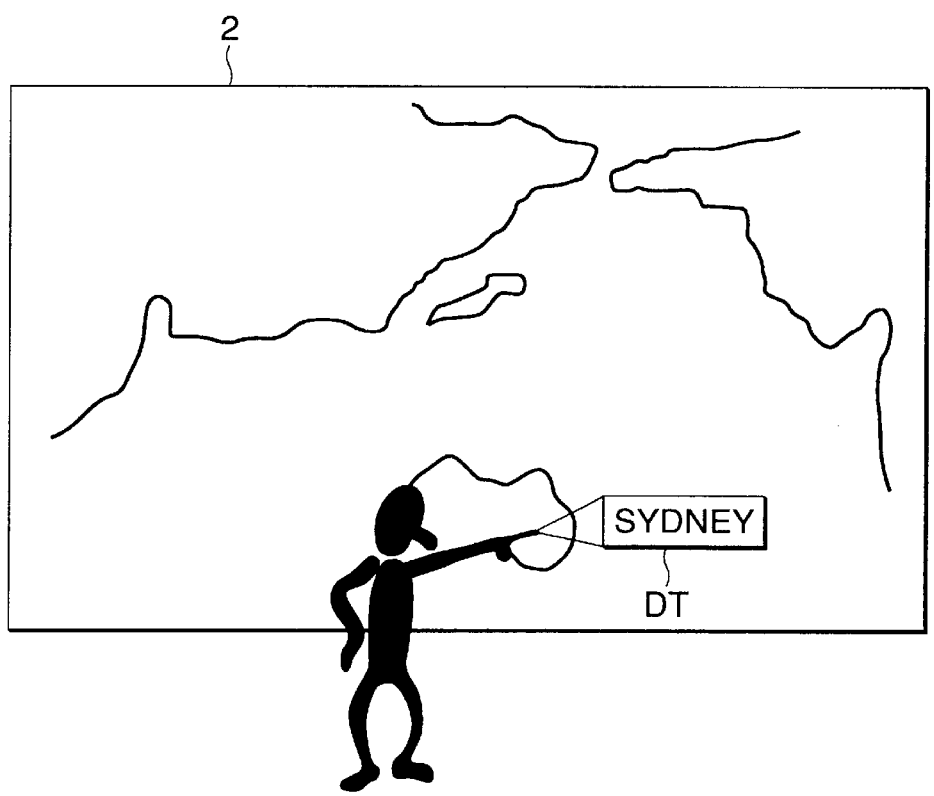
FIG. 7 illustrates a second application example of the interactive display according to the first embodiment.

FIG. 7 shows a second application example of the interactive display system 1 according to this embodiment. In this example, a map of the world is displayed on the semi-transparent screen 2 as an image projected by the projector 5 under the control of the control device 6.

For example, the map of the world may be displayed by performing a manipulation on the menu picture M shown in FIG. 5. Alternatively, it may be displayed automatically when a user (explainer) who has approached to the semi-transparent screen 2 to a certain extent has been detected as a "close body." As for the display form in this state, it is possible to display a map so that a reference country or area (for instance, Japan) is always located at a position close, in the horizontal direction, to the position in front of the semi-transparent screen 2 where the explainer stands.

In this example, an explanatory image DT that is some explanation as to an area designated by the explainer is superimposed on the map (i.e., the semi-transparent screen 2) at a designated position. This is done in such a manner that the control device 6 detects, as the position of a manipulation body, the position (coordinates) pointed by the explainer with his finger or the like and performs a control to display the explanatory image DT of the area corresponding to the detected position of the manipulation body. Image data of the map and various explanatory images DT are stored in advance in the database memory 15.

In the interactive display system 1 according to this embodiment, as described above, the size of the semi-transparent screen 2 as the display screen (and the manipulation panel) can be increased easily. Therefore, a conference or a demonstration using a large-size semi-transparent screen 2 like the second application example are applications to which the interactive display system 1 according to this embodiment is satisfactorily applied.

Figure 8:
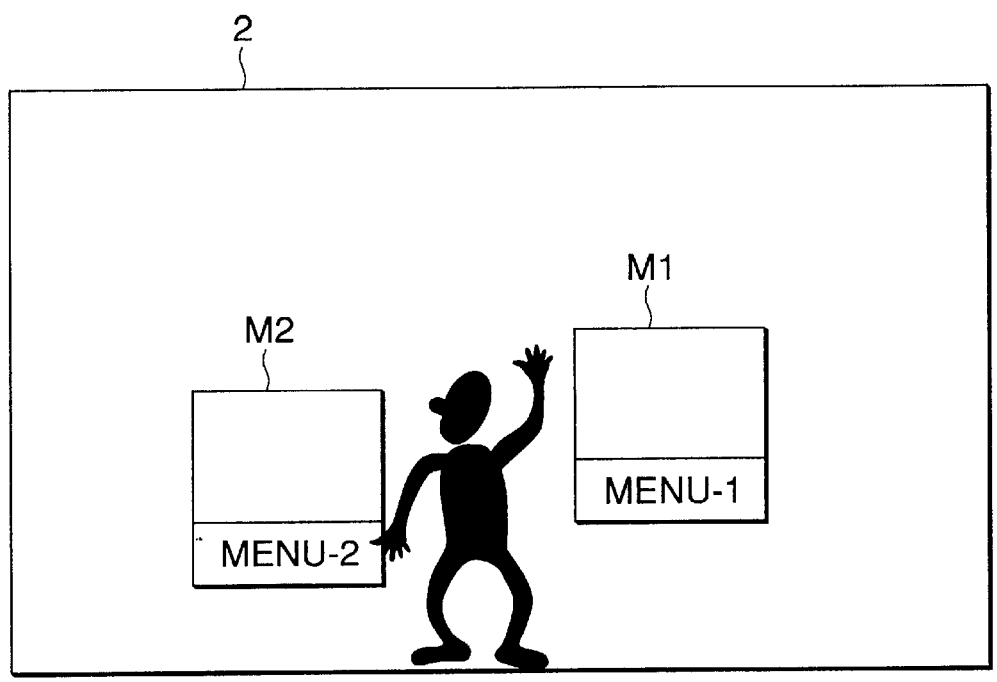
FIG. 8 illustrates a third application example of the interactive display according to the first embodiment.

FIG. 8 shows a third application example of the interactive display system according to this embodiment. FIG. 8 shows a state that two menu pictures M1 and M2 are displayed simultaneously and a user is performing manipulations at the same time on the menu pictures M1 and M2.

As described above, in this embodiment, the manipulation information is obtained from the "detection image information" that is produced based on an infrared image that is photographed by the CCD camera 4. That is, the manipulation information is obtained by recognizing an image state. Therefore, even if a plurality of manipulation bodies (in this example, hands or fingers of the user) are detected at the same time in the detection image information as in the case of FIG. 8, detection results of the respective manipulation bodies can be handled as different pieces of manipulation information.

Therefore, in this embodiment, a configuration is possible in which even if the user performs manipulations on a plurality of (in this example, two) menu pictures M1 and M2 at the same time with his hands as shown in FIG. 8, proper operations responsive to the manipulations that have been performed on the menu pictures M1 and M2 are performed. In the interactive display system 1 according to this embodiment, the size of the semi-transparent screen 2 can be increased easily. A large-size display panel (manipulation panel) can be utilized particularly effectively by displaying a plurality of images as subjects of manipulation simultaneously.

Figure 9:
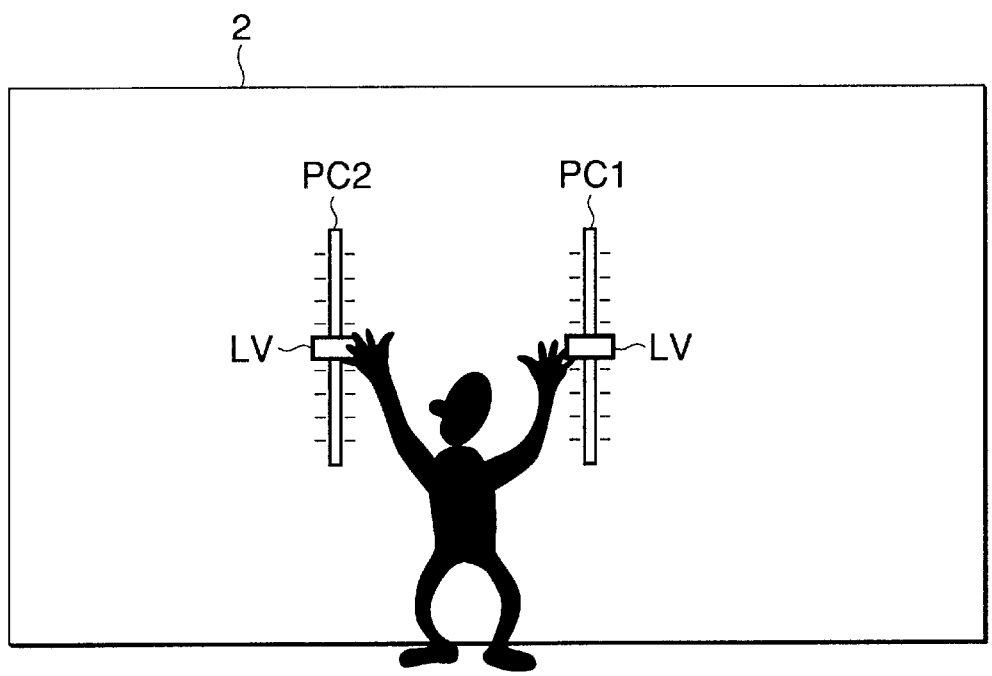
FIG. 9 illustrates a fourth application example of the interactive display according to the first embodiment.

FIG. 9 shows a fourth application example of the interactive display system 1 according to this embodiment. FIG. 9 shows a state that parameter adjustment images PC1 and PC2 for adjustment of the values of certain parameters are displayed on the semi-transparent screen 2 and a user is performing manipulations at the same time on the parameter adjustment images PC1 and PC2 with his hands. For example, the parameter adjustment images PC1 and PC2 are images simulating slide volumes.

In this example, for example, the user performs manipulations in such a manner that he places his hands on the semi-transparent screen 2 at lever portions (lever images LV) of the respective parameter adjustment images PC1 and PC2 and moves, that is, slides, his hands vertically so as to obtain desired parameter values. In this example, a display is so made that the lever images LV are moved vertically in accordance with the movements of the hands, and the control device 6 executes a corresponding process to variably control the actual parameter values accordingly. As in the case of FIG. 8, even if the lever images LV are manipulated at the same time, the respective pieces of manipulation information can be recognized simultaneously and the parameter values can be varied simultaneously in accordance with the respective manipulations.

Figure 10:
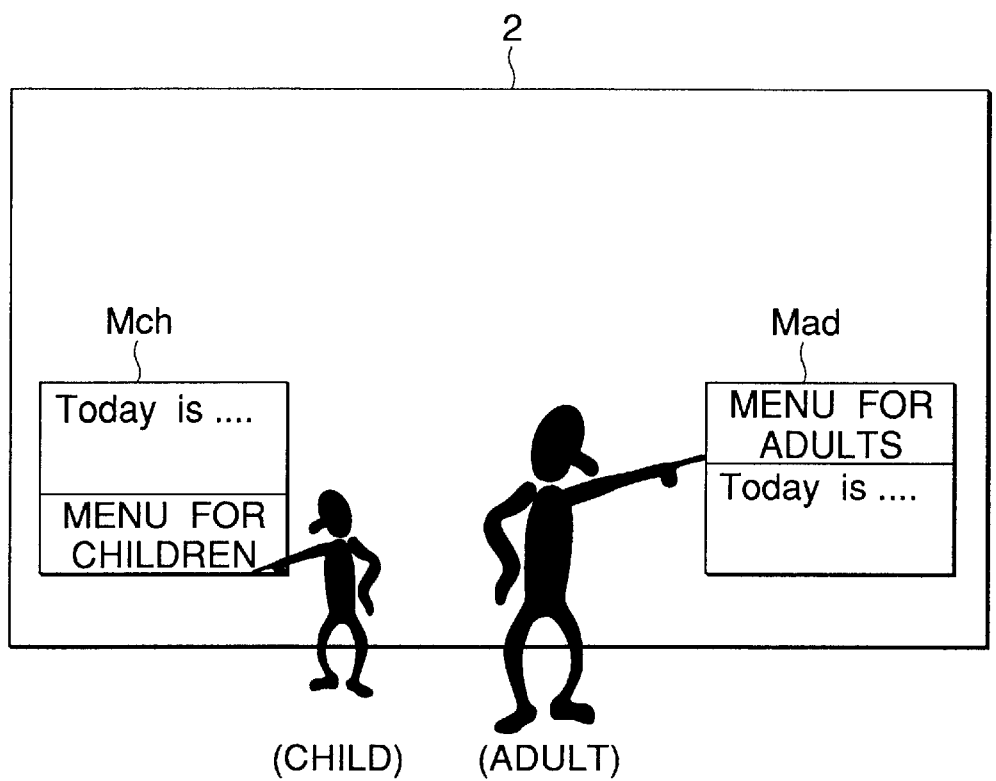
FIG. 10 illustrates a fifth application example of the interactive display according to the first embodiment.

FIG. 10 shows a fifth application example of the interactive display system 1 according to this embodiment. FIG. 10 shows a state that an adult person and a child are performing manipulations on different menu pictures at the same time.

In this example, the system 1 is used in the following situation. With an assumption that users perform manipulations on the semi-transparent screen 2 in a standing state, the occupation ratio and the position-related state of a close body (described above in connection with FIG. 6) and the vertical position (height) of a manipulation body on the semi-transparent screen 2 are different for an adult person and a child. That is, because of a difference in height, a child appears as a close body in a lower region in the detection image information than an adult person. Similarly, a manipulation body (user's finger or the like) of an adult person tends to appear in a lower region in the detection image information than that of a child.

In view of the above, in the fifth application example, in a case where the application is such that an adult person and a child are supposed to perform different kinds of manipulations, a certain threshold value is set for the vertical height in the detection image information. When a close body or a manipulation body is detected whose height exceeds the predetermined threshold value, a menu picture Mad for adults is displayed at the position of the close body or the manipulation body (the height is also changed that is included in the definition of the display position on the semi-transparent screen 2 in this example). When a close body or a manipulation body is detected whose height does not exceed the threshold value, a menu picture Mch for children is displayed at the position (including the height) of the close body or the manipulation body. The threshold value may be proper values that are different for a close body and a manipulation body. And the threshold value for height discrimination may be different for adults and children.

The fifth application example is the same as the application examples of FIGS. 8 and 9 in that a configuration is possible in which when manipulations are performed on the menu picture Mad for adults and the menu picture Mch for children at the same time, corresponding pieces of manipulation information are recognized simultaneously and control operations responsive thereto are performed.

For the second to fifth application examples shown in FIGS. 7–10, flowchart-based descriptions for the control device 6 are omitted. However, those application examples are the same as the first application example of FIG. 5 in that the presence/absence and the position (coordinates) of a "close body" or a "manipulation body" is detected and a necessary control operation is performed by recognizing a positional relationship between a detection result and a certain manipulation subject image that is displayed on the semi-transparent screen 2. A process corresponding to each of the second to fifth application examples can be realized basically in the same manner as according to the flowchart of FIG. 6.

Embodiment 2

FIG. 11 shows an interactive display system according to a second embodiment of the invention. The components in FIG. 11 that are the same as the corresponding components in FIG. 2 are given the same reference numerals as the latter and will not be described below. Further, the control device 6 may have the same internal configuration as that shown in FIG. 2.

In the second embodiment, as shown in FIG. 11, an infrared transmitter PD that emits infrared light is used as a pointing device.

As in the case of the first embodiment, in this embodiment the manipulation information is obtained based on the detection image information that is produced from an infrared image on the semi-transparent screen 2 that is photographed by the CCD camera 4. Therefore, in this embodiment, a variation in the quantity of infrared light entering the CCD camera 4 from the semi-transparent screen 2 can be recognized as manipulation information.

While in the first embodiment a finger or the like is used to point a desired position on the semi-transparent screen 2, in the second embodiment a user has the infrared transmitter PD with his hand and illuminates the front surface of the semi-transparent screen 2 at a desired position with an infrared beam emitted from the infrared transmitter PD.

When an infrared beam emitted from the infrared transmitter PD is applied to the semi-transparent screen 2, resulting detection image information becomes such that a level at the position (coordinates) illuminated with the infrared beam is different from levels of an area surrounding that position. Therefore, the input image processing section 12 of the control device 6 may operate so as to recognize such a level variation in the detection image information as manipulation information.

Since an infrared beam is invisible, it is preferable to, for instance, display a spot SP on the semi-transparent screen 2 so that a user can find a current illumination position on the semi-transparent screen 2 of an infrared beam emitted from the infrared transmitter PD. This spot display can be realized in such a manner that the input image processing section 12 of the control device 6 recognizes the current illumination position (coordinates) of an infrared beam based on the detection image information and a display control is performed so that the projector 5 projects the spot SP at the illumination position thus recognized.

Embodiment 3

FIG. 12 conceptually shows the entire configuration of an interactive display system 1B according to a third embodiment of the invention, and FIG. 13 is a block diagram showing the internal configuration of the control device 6. The components in FIGS. 12 and 13 that are the same as the corresponding components in FIGS. 1 and 2 are given the same reference numerals as the latter and will not be described below.

As shown in FIGS. 12 and 13, the interactive display system according to this embodiment is provided with two CCD cameras, that is, a first CCD camera 4A and a second CCD camera 4B. The first CCD camera 4A has the same role as the CCD camera 4 in the first embodiment. That is, the first CCD camera 4A is provided on the pack side of the semi-transparent screen 2 to photograph an image through infrared light coming from the entire semi-transparent screen 2 as an imaging range.

As described later, the second CCD camera 4B is provided to photograph an image in a prescribed region on the semi-transparent screen 2 with enlargement or reduction. To this end, as shown in FIGS. 12 and 13, the second CCD camera 4B has a pan/tilt/zoom mechanism 7. The pan/tilt/zoom mechanism 7 is provided with a mechanism (pan/tilt mechanism) for rotating the second CCD camera 4B in both horizontal and vertical planes as well as a mechanism (zoom mechanism) for varying the magnification factor of a photographing image by moving a zoom lens that is provided in the second CCD camera 4B. Controls on the pan/tilt/zoom mechanism 7, that is, a pan/tilt position variable control and a zoom ratio variable control, are performed by the database driving section 14 as shown in FIG. 13. Therefore, when necessary, the database memory 15 stores a program for controlling the pan/tilt/zoom mechanism 7.

Each of the CCD cameras 4A and 4B is provided with an infrared transmission filter 4a so as to photograph only an infrared image on the semi-transparent screen 2.

In this embodiment, as shown in FIG. 13, the control device 6 has two image input sections 11A and 11B that correspond to the first and second CCD cameras 4A and 4B, respectively. The image input section 11A receives an imaging signal from the first CCD camera 4A and supplies a corresponding video signal to the input image processing section 12, and the image input section 11B receives an imaging signal from the second CCD camera 4B and supplies a corresponding video signal to the input image processing section 12. Therefore, in this embodiment, the input image processing section 12 generates two kinds of detection image information based on the video signals of the first and second CCD cameras 4A and 4B, and produces manipulation information from the two kinds of detection image information.

For example, the interactive display system 1B according to this embodiment can be used in the following manner.

Figure 14A:
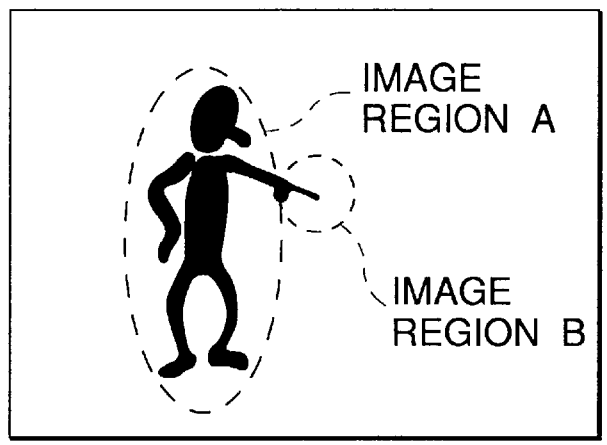
FIGS. 14A and 14B illustrate operation examples of the interactive display system according to the third embodiment.

Assume a case in which as shown in FIG. 12 a user is performing, with his finger, a manipulation on a certain position on the semi-transparent screen 2 in a state that he is located in front of the front surface of the semi-transparent screen 2. In this case, detection image information produced by the input image processing section 12 after photographing by the first CCD camera 4A for photographing the entire semi-transparent screen 2 is as shown in FIG. 14A. In the above type of manipulation, usually the finger (or hand) of the user is closest to the semi-transparent screen 2 and the remaining parts of his body are more distant from the semi-transparent screen 2 than this hand.

Therefore, the detection image information shown in FIG. 14A generally includes an image region A where the body is displayed and an image region B where the hand is displayed, and the latter has a large value (for instance, in the luminance level) than the former. As described above, the input image processing section 12 can recognize the image region B as a "manipulation body" by separating it from the background including the image region A. As described above, where the manipulation body is limited to a hand or a finger of a human body, a configuration is possible in which a hand or a finger of a user is recognized as a manipulation body based on its shape that is obtained as detection image information.

Figure 14B:
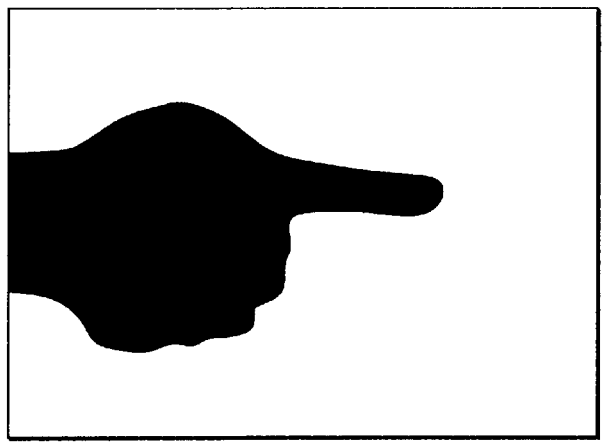

If the input image processing section 12 has detected the image region B as a "manipulation body," the database driving section 14 performs controls to zoom-photograph the manipulation body, that is, the image region B, with the second CCD camera 4B based on the information on the position of the manipulation body on the semi-transparent screen 2. Specifically, after a pan/tilt control is performed on the pan/tilt/zoom mechanism 7 based on the information on the position of the image region B on the semi-transparent screen 2 so that the image region B is located approximately at the center of a photographing image of the second CCD camera 4B, a zoom control is performed on the pan/tilt/zoom mechanism 7 so that the image region B occupies almost all of the photographing image. As a result of the above controls, detection image information obtained based on an imaging signal of the second CCD camera 4B becomes image information in which the image region B (manipulation body) is enlarged as shown in FIG. 14B.

Where manipulation information is obtained (particularly a designated position is detected) based on the detection imaging information shown in FIG. 14B, the relative resolution is made higher than in the case where the information of a designated position is obtained based on, for instance, the detection image information shown in FIG. 14A. This makes it possible to obtain more accurate information of a designated position.

The above application method is just an example, and other various application examples are conceivable that uses two CCD cameras. Further, the pan/tilt/zoom mechanism 7 may be provided in both CCD cameras. Still further, a configuration is conceivable in which three or more CCD cameras are used (the pan/tilt/zoom mechanism may be provided in any of those CCD cameras), and pieces of manipulation information are independently obtained from the respective CCD cameras. This configuration also provides various application examples.

Embodiment 4

FIG. 15 conceptually shows an example configuration of an interactive display system 1C according to a fourth embodiment of the invention. The components in FIG. 15 that are the same as the corresponding components in, for instance, FIG. 1 are given the same reference numerals as the latter and will not be described below. Further, the control device 6 may have the same the internal configuration as that shown in FIG. 2.

In the interactive display systems according to the above embodiments, the semi-transparent screen 2 is a wall-like one. However, consideration of the functions (as a display panel and a manipulation panel) of the semi-transparent screen 2 leads to an understanding that the semi-transparent screen 2 should not be limited to the wall-like one. In the interactive display system 1C according to this embodiment, a semi-transparent screen 2A has a curved shape. FIG. 15 shows a state that a semi-spherical semi-transparent screen 2A is installed. For example, at least the infrared LED panel 3, the CCD camera 4, and the projector 5 are provided inside the semi-spherical semi-transparent screen 2A. Users perform manipulations from outside the semi-transparent screen 2A. Although the infrared transmission filter 4a provided in the CCD camera 4 and the infrared cutoff filter 5a provided in the projector 5 are not shown in FIG. 15, actually they are provided in the same manner as in the above embodiments.

FIG. 15 shows a state that a map of the world is projected on the semi-transparent screen 2A. In this case, the interactive display system 1C can be used in the same manner as described in the first embodiment in connection with FIG. 7.

Embodiment 5

Figure 16:
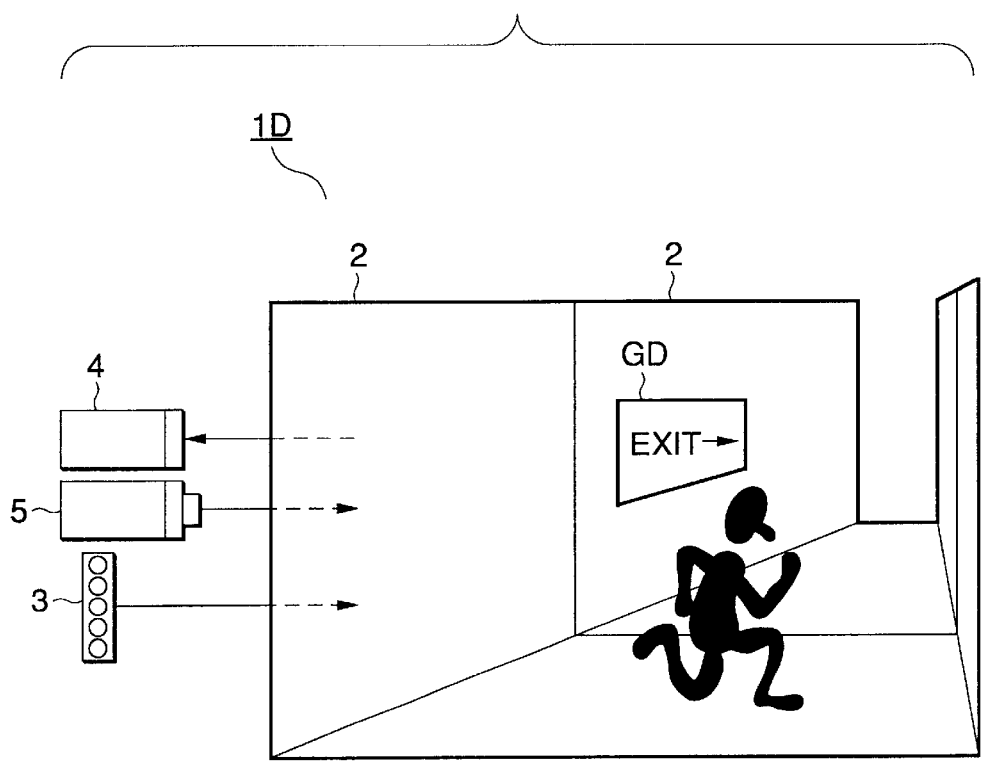
FIG. 16 conceptually shows an example configuration of an interactive display system according to a fifth embodiment of the invention.

FIG. 16 conceptually shows an example configuration of an interactive display system 1D according to a fifth embodiment of the invention. The components in FIG. 16 that are the same as the corresponding components in FIG. 1 are given the same reference numerals as the latter and will not be described below. Although the infrared transmission filter 4a and the infrared cutoff filter 5a are not shown in FIG. 16, actually they are provided in the CCD camera 4 and the projector 5, respectively. Although the control device 6 is not shown in FIG. 16 either, actually it is provided to control the infrared LED panel 3, the CCD camera 4, and the projector 5. The control device 6 may have the same the internal configuration as that shown in FIG. 2.

In this embodiment, for example, the semi-transparent screen 2 is provided as a wall surface of a passage. For example, the infrared LED panel 3, the CCD camera 4, and the projector 5 are provided behind the wall surface (semi-transparent screen 2) of the passage. That is, the interactive display system 1D according to this embodiment serves as part of the wall surface of the passage.

Now assume that a user (pedestrian) is walking on the passage and has just passed by the semi-transparent screen 2 (wall surface) of the interactive display system 1D.

As described above, in the invention, even if a user is somewhat distant from the semi-transparent screen 2 that functions as a manipulation panel, he can be detected as a "close body." Therefore, in this example, when a pedestrian has come to a position aside of the semi-transparent screen 2 (wall surface) of the interactive display system 1D, his figure is detected as a close body. For example, an operation is possible in which based on a detection result of a close body, a guide image GD showing, for instance, a place to which the passage leads is projected on the semi-transparent screen 2 (wall surface) by the projector 5 as shown in FIG. 16.

When viewed from the pedestrian side, the operation of the interactive display system 1D would look such that a guide display of the place to which the passage leads automatically appears as he walks on the passage.

Figure 17:
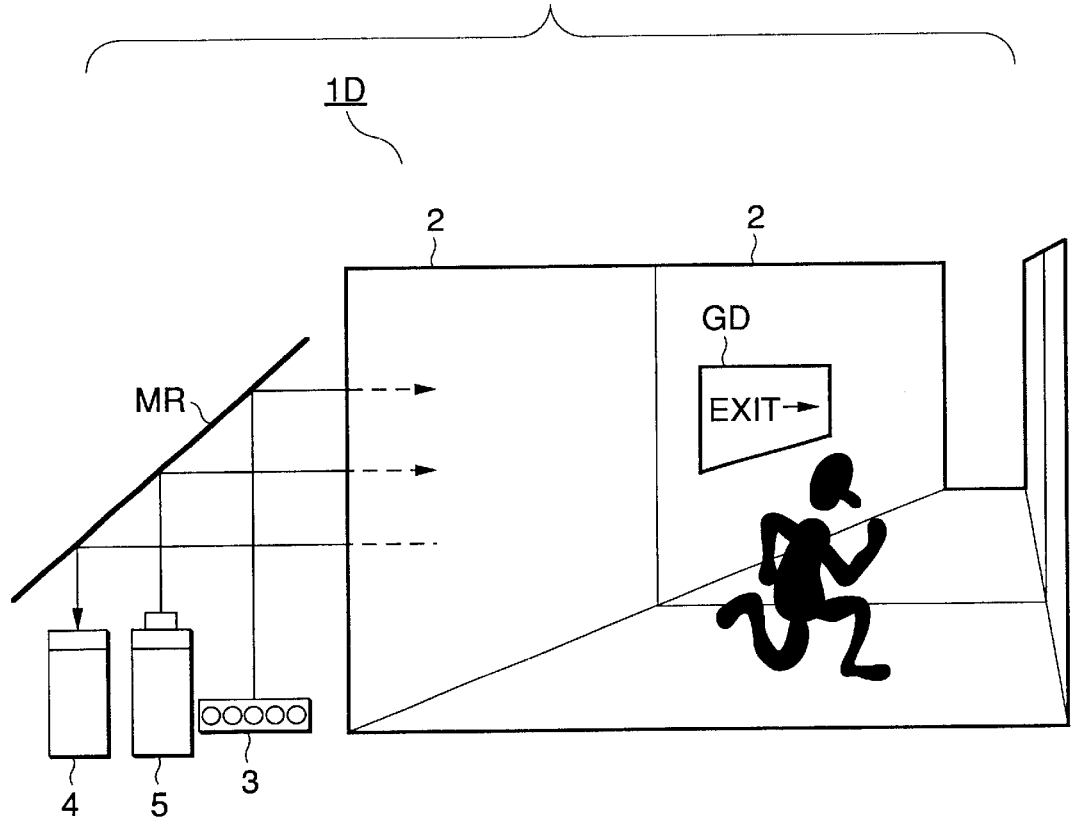
FIG. 17 conceptually shows another example configuration of an interactive display system according to the fifth embodiment of the invention.

In the fifth embodiment, in a case where there is not a sufficient space to install the infrared LED panel 3, the CCD camera 4, and the projector 5 (and the control device 6) on the back side of the passage, the optical paths of light beams emitted from the infrared LED panel 3 and the projector 5 and a light beam to enter the CCD camera 4 may be changed through reflection by using a mirror MR as shown in FIG. 17. In particular, depending on the angles of view of the CCD camera 4 and the projector 5, a considerably long distance may be needed to obtain an imaging range or a projection display range capable of covering a large-size semi-transparent screen 2. By using the mirror MR, a sufficiently wide imaging range or projection display range can be obtained even with a short depth. This relaxes the conditions that should be satisfied by an environment in which to install the interactive display system 1D according to this embodiment.

Embodiment 6

Figure 18:
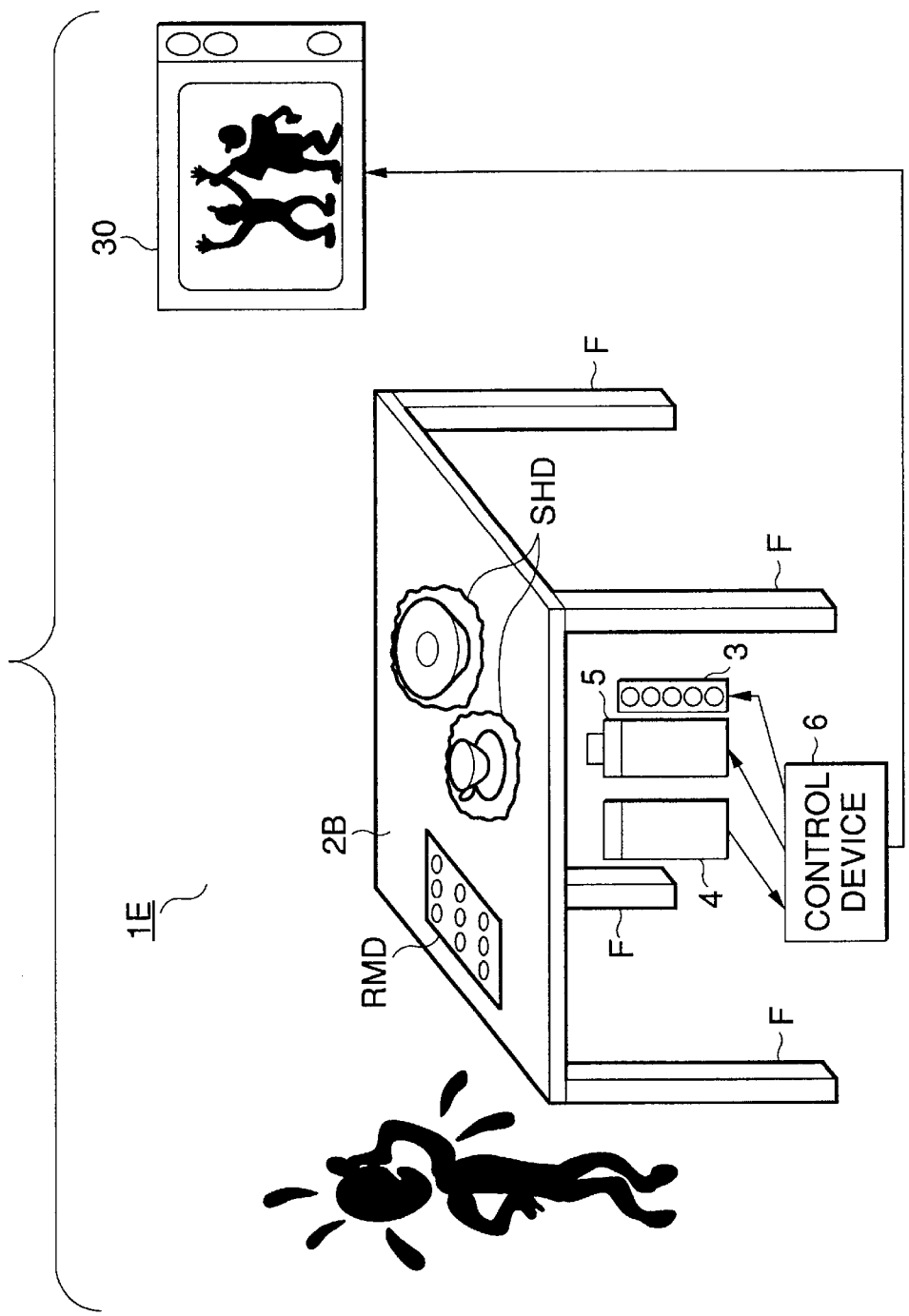
FIG. 18 conceptually shows an example configuration of an interactive display system according to a sixth embodiment of the invention.

FIG. 18 conceptually shows an example configuration of an interactive display system 1E according to a sixth embodiment of the invention. The components in FIG. 18 that are the same as the corresponding components in FIG. 1 are given the same reference numerals as the latter and will not be described below. Although the infrared transmission filter 4a and the infrared cutoff filter 5a are not shown in FIG. 16, actually they are provided in the CCD camera 4 and the projector 5, respectively.

In this embodiment, a semi-transparent screen 2B is installed as a table. That is, supported by four table legs F the semi-transparent screen 2B also functions as the top plate of a table as an ordinary piece of furniture. In this embodiment, as shown in FIG. 18, the infrared LED panel 3, the CCD camera 4, the projector 5 (and the control device 6) are provided under the semi-transparent screen 2B.

As described later, this embodiment is so configured that when a user performs a manipulation on the semi-transparent screen 2B, a monitor device 30 is controlled in accordance with the manipulation.

Figure 19:
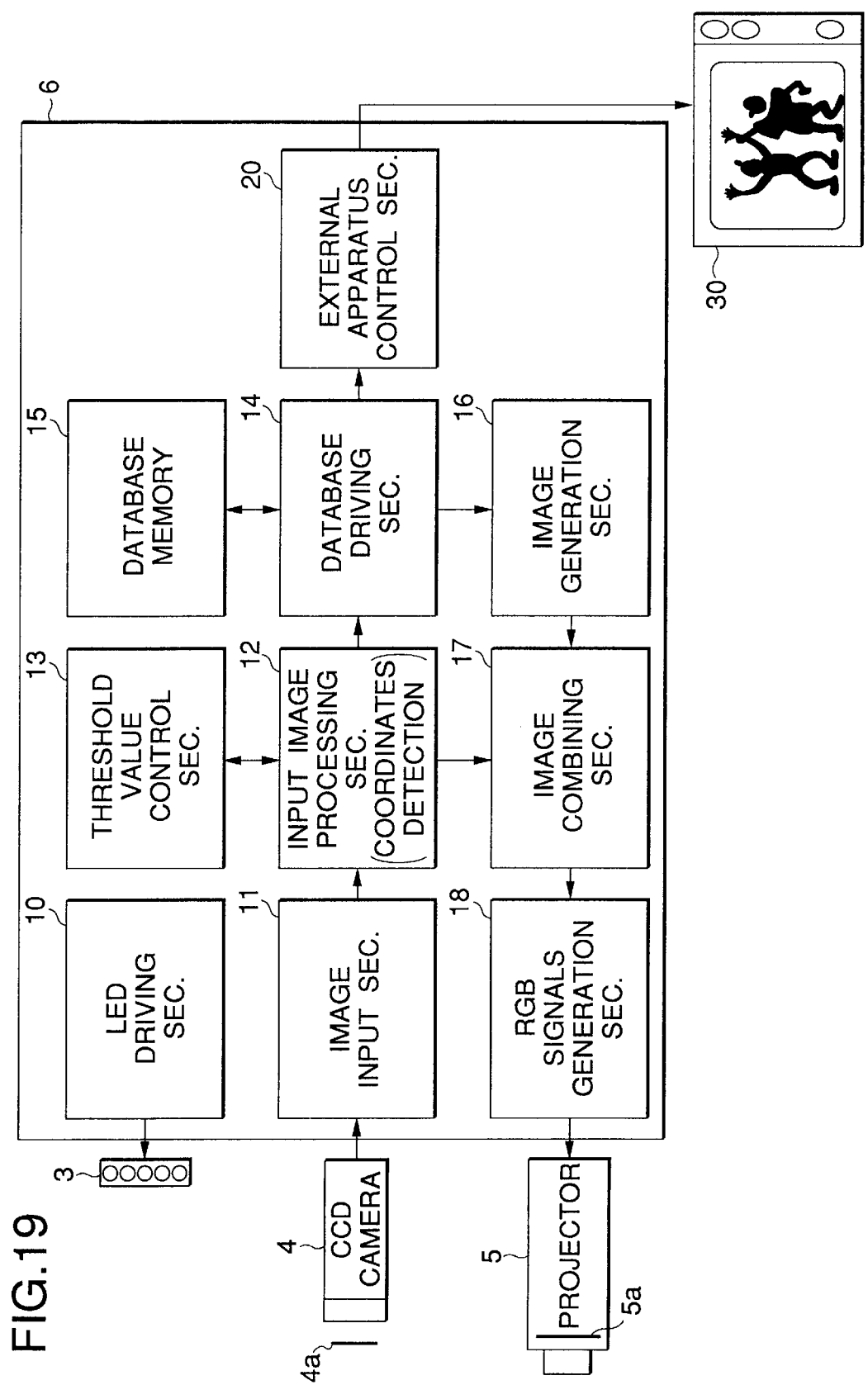
FIG. 19 shows the internal configuration of a control device provided in the interactive display system according to the sixth embodiment.

FIG. 19 is a block diagram showing the internal configuration of the control device 6 of the interactive display system 1E according to this embodiment. The components in FIG. 19 that are the same as the corresponding components in FIG. 2 are given the same reference numerals and will not be described below.

The control device 6 shown in FIG. 19 is provided with an external apparatus control section 20. In this embodiment, the external apparatus control section 20 is a circuit for performing a manipulation control on the monitor device 30. The external apparatus control section 20 receives manipulation information from the database driving section 14, and transmits, to the monitor device 30, a command signal for a necessary manipulation control on the monitor device 30. Therefore, the database memory 14 stores a program for realizing manipulations on the monitor device 30 in the interactive display system 1E.

In the interactive display system 1E according to the sixth embodiment, for example, a remote controller display RMD is displayed in a particular region on the semi-transparent screen 2B as shown in FIG. 18. The remote controller display RMD simulates the manipulation panel surface of a remote controller having keys that enable various manipulations on the monitor device 30. A display control of the remote controller display RMD is realized in such a manner that the database driving section 14 performs a display control by using image data of the remote controller display RMD that is stored in the database memory 15, to cause the projector 5 to project an image of the remote controller display RMD.

The position of the remote controller display RMD may be set arbitrarily. For example, the remote controller display RMD may be displayed at an arbitrary position that is convenient (i.e, easy to use) for a user in response to a prescribed setting manipulation on the interactive display system 1E. In this case, if the database driving section 14 recognizes only a current display position of the remote controller display RMD, it can always grasp the display positions (coordinates) of various keys of the remote controller display RMD.

Now assume a case that a user has selected a desired channel by manipulating a numeral key (i.e., by a manipulation on the remote controller display RMD displayed on the semi-transparent screen 2B). At this time, the user may perform an manipulation on the semi-transparent screen 2B with a feeling of depressing a desired one of the numeral keys of the remote controller display RMD on the semi-transparent screen 2B. In this case, depending on the setting of a threshold value for key manipulation judgment in the threshold value control section 13, the user need not always bring a manipulation body such as a finger into contact with the table surface (semi-transparent screen 2B). It is naturally possible to judge, as a key manipulation, a manipulation that is performed on a space above a desired key.

The position (coordinates) of the above manipulation of the user is detected by the input image processing section 12 based on detection image information that is obtained through photographing of the CCD camera 4. The database driving section 14 judges the coordinates of which key of the remote controller display RMD the detected coordinates of the manipulation position coincide with, and transmits, for instance, information indicating the type of the key whose coordinates coincide with those of the manipulation position to the external apparatus control section 20.

Based on the information indicating the type of key that is supplied from the database driving section 14, the external apparatus control section 20 outputs a command signal corresponding to the type of key to the monitor device 30.

Since the manipulation being considered is a channel switching manipulation using one numeral key, the database driving section 14 should transmits information to the effect that a numeral key corresponding to some channel number has been manipulated. The external apparatus control section 20 transmits a command signal for making a switch to the channel number corresponding to the designated numeral key. As a result, the monitor device 30 operates to make a switch to a picture of the manipulated channel.

It goes without saying that the external apparatus that can be manipulated by the interactive display system 1E is not limited to the monitor device (television receiver). A configuration is possible which allows any of other various electronic apparatuses to be manipulated. The invention enables a configuration in which remote controller displays RMD for plural kinds of apparatuses are displayed simultaneously to allow a user's manipulation thereon. It is also possible to recognize simultaneous manipulations on a plurality of keys of one remote controller display RMD and to control the external apparatus accordingly.

Where the semi-transparent screen 2B is a table surface as in the case of this embodiment, the following operation is possible.

For example, where some object such as a piece of tableware is placed on the semi-transparent screen 2B as the table surface, an image reflecting the shape of the object is obtained as detection image information through infrared light that is reflected from the object. In the previous embodiments, this type of variation in image is used as manipulation information. In contrast, in this embodiment, image data of the detection image information can be used as an image to be projected by the projector 5. That is, for example, a configuration is possible in which an image of an object placed on the semi-transparent screen 2B is used like its shadow (see shadow displays SHD shown in FIG. 18). In this case, the position of a shadow display SHD on the semi-transparent screen 2B varies so as to follow the position of the object. And the shape of the shadow display SHD varies in accordance with the distance of the object from the surface of the semi-transparent screen 2B. Therefore, there can be obtained a visual effect that would be interesting to a user.

To realize the above type of shadow display SHD, detection image information that is obtained in the input image processing section 12 of the control device 6 may be supplied to the image combining section 17 as image data. The image combining section 17 combines image data (detection image information; image data for a shadow display SHD) and a remote controller display RMD that has been generated by the image generation section 17 under the control of the database driving section 14, whereby a resulting image is finally projected onto the semi-transparent screen 2B as shown in FIG. 18.

Although a detailed description is not made here, an enhanced visual effect can be obtained by applying a special effect to image data of detection image information through proper signal processing, such as multi-colorizing it or changing its shape.

Figure 20:
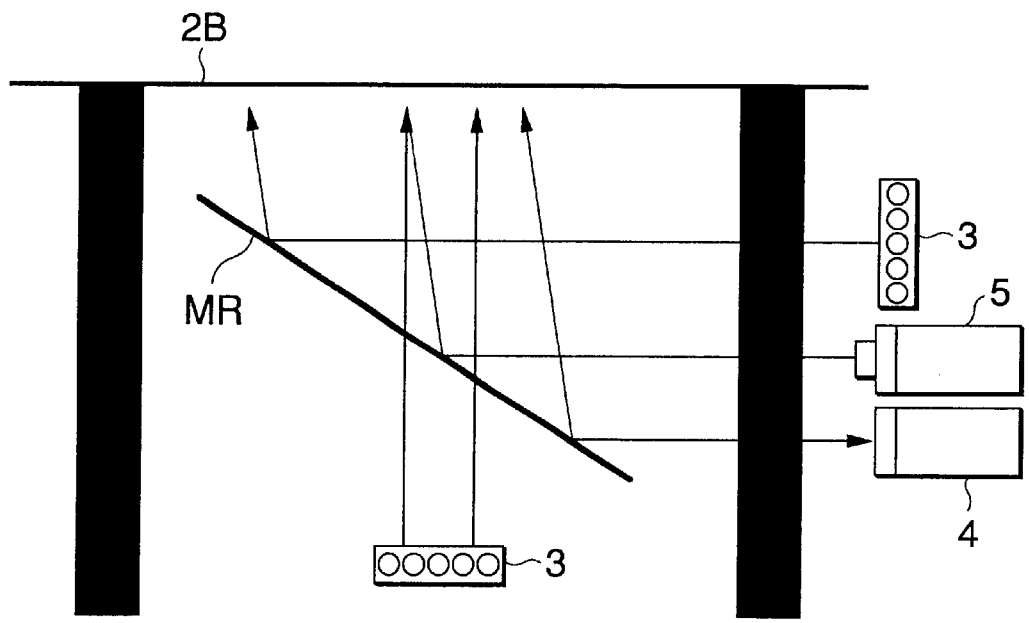
FIG. 20 conceptually shows another example configuration of an interactive display system according to the sixth embodiment of the invention.

Incidentally, in the sixth embodiment described above, it is necessary to provide at least the infrared LED panel 3, the CCD camera 4, and the projector 5 under the table. However, there may occur a case that because of an insufficient distance between the floor and the table surface (semi-transparent screen 2B) it is difficult to secure a straight distance that is necessary for the CCD camera 4 or the projector 5 to cover the entire semi-transparent screen 2B. In such a case, as already described in the fifth embodiment, a mirror MR for changing the optical paths through reflection may be provided under the semi-transparent screen 2B (table surface) as shown in FIG. 20. The infrared LED panel 3, the CCD camera 4, the projector 5, etc. may be provided on the side of the table.

A half mirror MR having preset transmittance and reflectance values may be used instead of the mirror MR. In this case, the infrared LED panel 3, for instance, may be provided in the floor portion that is under the table, rather than on the side of the table. This means an increase in the degree of freedom of the device installation. The installation method using a half mirror can also be applicable to the installation form of FIG. 17 (fifth embodiment).

Embodiment 7

Figure 21:
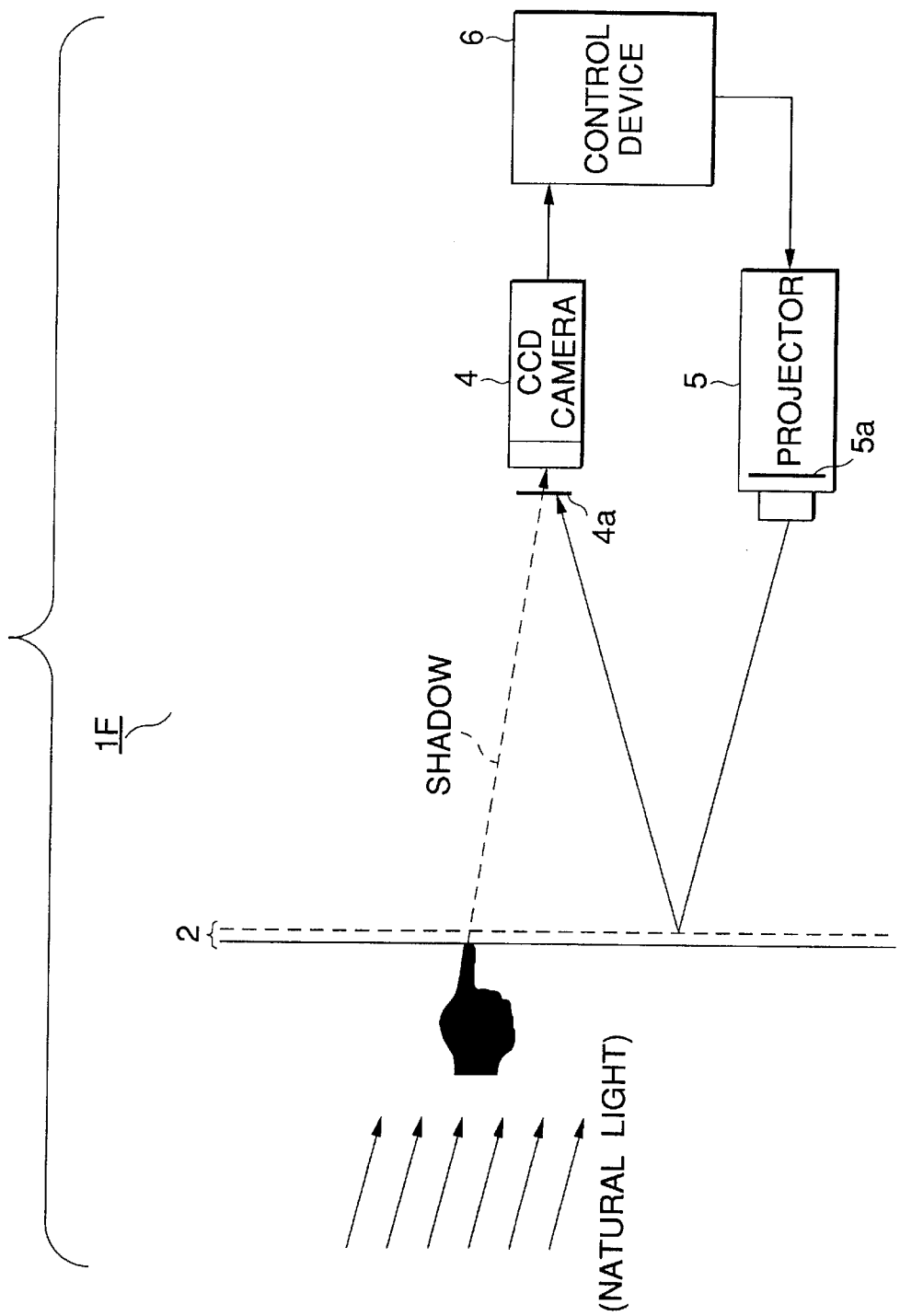
FIG. 21 conceptually shows an example configuration of an interactive display system according to a seventh embodiment of the invention.

FIG. 21 conceptually shows an example configuration of an interactive display system 1F according to a seventh embodiment of the invention. The components in FIG. 21 that are the same as the corresponding components in FIG. 1 are given the same reference numerals as the latter and will not be described below.

The infrared LED panel 3 is not provided in the interactive display system 1F.

For example, where the interactive display system according to the invention is used outdoors, that is, in an environment of strong ambient light, there is a possibility that manipulation information cannot be detected properly (i.e., proper detection image information that enables recognition of manipulation information cannot be obtained) in the configuration as shown in FIG. 1 in which infrared light emitted from the infrared LED panel 3 is used for detection of manipulation information. This because the intensity of infrared light emitted from the infrared LED panel 3 is relatively lowered by the presence of strong infrared light in daytime natural light.

In view of the above, in this embodiment, infrared light included in natural light is used for detection of manipulation information instead of using the infrared LED panel 3.

In this embodiment, the reference input image levels Lint that are necessary to obtain detection image information are detected based on image information that is obtained from an imaging signal produced by the CCD camera 4 based on infrared light that has come from the front side and passed through the semi-transparent screen 2, for example, in a state that neither a close body nor a manipulation body exists.

When some manipulation is performed on the semi-transparent screen 2, a close body, a manipulation body, or the like is viewed from the CCD camera 4 side as an infrared shadow on the semi-transparent screen 2 because it interrupts infrared light included in natural light. In the control device 6 of this embodiment, image information that varies in such a manner that the image level decreases (i.e., an image becomes darker) from the reference input image levels Lint is used as manipulation information.

The internal configuration of the control device 6 of the interactive display system is not shown. However, it is noted that the LED driving section 10 is not provided because of the elimination of the infrared LED panel 3.

Embodiment 8

FIG. 22 conceptually shows. the entire configuration of an interactive display system IG according to an eighth embodiment of the invention, and FIG. 23 is a block diagram showing the internal configuration of the control device 6 of the interactive display system 1G. The components in FIGS. 22 and 23 that are the same as the corresponding components in FIGS. 1 and 2 are given the same reference numerals as the latter and will not be described below.

In the interactive display system 1G, the infrared LED panel 3 and the CCD camera 4 of the above-described embodiments are replaced by a microwave generator 40 and a microwave receiver 41, respectively.

Accordingly, in the control device 6, a microwave driving circuit 110 for driving the microwave generator 40 is provided instead of the LED driving section 10 (see FIG. 1). Also provided are a reception signal input section 111 for converting reception microwaves that are supplied from the microwave receiver 41 into data of a predetermined form and outputting it and an input data processing section 112 for executing a prescribed process on microwave reception data that is supplied from the reception signal input section 111 to thereby obtain, for instance, detection image information and for obtaining manipulation information based on the detection image information. The reception signal input section 111 and the input data processing section 112 are functional circuit sections that replace the image input section 11 and the input image processing section 12 (see FIG. 1), respectively. In this example, since microwaves are used as a medium for detection of manipulation information, it is not necessary to use the infrared transmission filter 4a and the infrared cutoff filter 5a that were provided in the CCD camera 4 and the projector 5, respectively, in the above embodiments.

An information input apparatus according to the invention can be constructed even by using, for detection of manipulation information, such a medium as microwaves having a feature of being reflected by an object, basically in the same manner as in the above embodiments (in which infrared light is used for detection of manipulation information).

Although no specific application example is shown nor described, it is naturally possible to construct an information input apparatus according to the invention by omitting the projector 5 that was provided in the above embodiments, because in the invention it is sufficient to detect information on a manipulation that is performed on the semi-transparent screen 2. In this case, the semi-transparent screen 2 functions as only a manipulation panel. Where a display means capable of interactive response display is necessary while this configuration is maintained, display device other than the semi-transparent screen 2 may be used.

Application examples of the interactive display systems that are constructed according to the invention are not limited to the embodiments and the application examples described above. Other various manipulation methods and applications are possible that make use of the advantages of the input apparatus of the invention. It is also possible to perform an interactive response by voice in the interactive display systems according to the embodiments of the invention.

As is apparent from the above descriptions of the embodiments, the invention provides the following advantages.

The invention provides an information input apparatus comprising a semi-transparent screen that functions as an operator input manipulation surface; pickup means for picking up an input manipulation of an operator on the semi-transparent screen by capturing only light or electromagnetic waves in a predetermined wavelength range that comes through the semi-transparent screen, to thereby produce a pickup signal; and control processing means for generating detection image information corresponding to the input manipulation of the operator based on the pickup information, and for executing a control process based on input manipulation information that is recognized based on the detection image information.

In the information input apparatus having the above basic configuration, any object that causes a variation in the state of light or electromagnetic waves in a predetermined wavelength range by, for instance, reflecting it can serve as a manipulation body with which to perform a manipulation. That is, no special pointing device for a manipulation is needed. Since a manipulation body that is located close to the semi-transparent screen (for instance, in a space in front of the semi-transparent screen) is recognizable, various manipulation methods are possible. For example, a manipulation may be performed in a space in front of the front surface of the semi-transparent screen without bringing the manipulation body into contact with the semi-transparent screen as a manipulation panel, or an object approaching the semi-transparent screen may be recognized. A response process corresponding to a recognized manipulation is executed.

Since the manipulation panel of the invention may be a mere semi-transparent screen, its size can easily be increased in contrast to the case of the conventional touch panel.

The control processing means may be so configured as to be able to recognize plural pieces of input manipulation information based on image states of the detection image information and to execute different control processes based on the respective pieces of input manipulation information. In this case, a plurality of subjects of detection can be recognized at the same time and control processes responsive to the respective detected subjects can be executed independently. For example, it is possible to perform manipulations on a plurality of menu pictures at the same time.

The control processing means may be so configured as to recognize the input manipulation information based on a particular image shape that is obtained as an image state of the detection image information. In this case, for example, it is possible to determine whether to employ a subject of detection as manipulation information based on its shape. This technique easily enables employment, as manipulation information, of only manipulations performed with a hand or a finger of a human body.

The control processing means may be so configured as to be able to recognize a hand or a finger of a human body as a subject of detection of the input manipulation information. In this case, for example, it is possible to recognize motion of a hand or a finger of a human body as manipulation information based on an image shape that is obtained in the detection image information and to prevent other subjects of detection from being recognized as manipulation information.

The information input apparatus of the invention may further comprise projection display means provided so as to be able to project, onto the semi-transparent screen, an image of visible light in an wavelength range excluding the predetermined wavelength range of light or electromagnetic waves to be captured by the pickup means, wherein the control processing means executes, as the control process, a display image generation process for causing the projection display means to project a display image and a control on the projection display means. In this case, the semi-transparency of the semi-transparent screen is utilized. That is, by projecting an image onto the semi-transparent screen with a projector or the like, the semi-transparent screen can be used as not only a manipulation panel but also a display panel for image display.

A menu picture for causing the control processing means to execute a prescribed process may be set as the display image. The menu picture prompts a user to perform various kinds of manipulations. Alternatively, an initial image having a predetermined content may be set as the display image. The control processing means may have attribute information relating to an image content of a particular region in the initial image, wherein when it has been judged that the particular region has been designated as the input manipulation information, the control processing means executes a control process so that the projection display means projects an image indicating the attribute information relating to the designated region. In this case, an application is possible in which an initial image such as a map is displayed and designation of some area on the map causes display of its attribute information such as an explanation of that area. In each of the above cases, a direct input form of manipulation information is realized in which a user performs a manipulation on an image displayed on the semi-transparent screen.

The control processing means may be so configured as to be able to generate the display image by using the detection image information. In this case, an image can be displayed on the semi-transparent screen by using the detection image information. Alternatively, the control processing means may execute the display image generation process so that the display image is displayed in an area on the semi-transparent screen corresponding to a located position of a physical object on the semi-transparent screen or in a space near the semi-transparent screen. In this case, by utilizing the detection image information, a visual effect can be obtained such as displaying a shadow of an object placed on the semi-transparent screen so as to be associated with the object.

The pickup means may comprise irradiating means for always irradiating the semi-transparent screen with light or electromagnetic waves in the predetermined wavelength range that are to be captured by the pickup means. In this case, a medium (for instance, infrared light or microwaves) to be captured by the pickup means can be obtained in a stable manner. This provides high reliability irrespective of the installation environment of a system having the information input apparatus.

The semi-transparent screen may be formed by combining a material (such as glass) for forming a transparent screen and a material (some semi-transparent film) for forming a semi-transparent screen. In this case, the semi-transparent screen can be formed at a low cost while the above-mentioned capability of providing a large-size screen is maintained.

The semi-transparent screen may constitute a wall surface, have a curved surface, or be disposed so as to constitute a table surface. In this manner, the semi-transparent screen may be used in various forms. Accordingly, the application range of the information input apparatus of the invention is increased.

The information input apparatus of the invention may further comprise pointing device means capable of causing a state variation in light or electromagnetic waves in the predetermined wavelength range to be captured by the pickup means by irradiating the semi-transparent screen with light or electromagnetic waves. This is based on the feature of the basic configuration of the invention that any object that causes a variation in the state of light or electromagnetic waves in a predetermined wavelength range to be captured by the pickup means it can serve as a manipulation body. For example, with the use of a particular pointing device, a user can input manipulation information correctly from a position relatively distant from the semi-transparent screen.

The pickup means may comprise a plurality of imaging means for producing imaging signals through photographing with different magnification factors, wherein the control processing means executes the control process based on the detection image information that is generated based on imaging signals that are supplied from the plurality of imaging means. In this case, image information for detection is obtained with different magnification factors by a plurality of imaging means provided as the pickup means. Further, the control processing means may select, according to a predetermined rule, a particular imaging region of an area of detection image information that is obtained based on an imaging signal produced by a predetermined one of the plurality of imaging means, and execute a control so that one of the imaging means that is different from the predetermined imaging means photographs an image in the particular imaging region with a varied magnification factor. In this case, for example, in recognizing a position on the semi-transparent screen pointed by a user, detection image information may be obtained by photographing the pointed region with the second imaging means while magnifying it. This enables highly accurate detection of a pointed position (coordinates).

As described above, the invention provides a high degree of freedom for the input of information such as a manipulation. Further, the invention easily provides a large-size manipulation panel that can also be used as a display panel, thereby providing possibilities of various application forms. That is, the invention provides an advantage that an interactive input/output environment can easily be advanced or enhanced.

What is claimed is:

1. An information input apparatus comprising:
    a semi-transparent screen that functions as an operator input manipulation surface;
    means for projecting a display image formed of visible light in a first wavelength range onto the semi-transparent screen;
    means for irradiating the semi-transparent screen with electromagnetic waves in a second wavelength range different from the first wavelength range such that a portion of the electromagnetic waves in the second wavelength range passes through the semi-transparent screen into the space in front of the semi-transparent screen and, thereafter, is reflected by a manipulation body, back through the semi-transparent screen;
    pickup means for receiving the electromagnetic waves in the second wavelength range and detecting input manipulations of the manipulation body both in a variable-distance space in front of a front surface of the semi-transparent screen and on the semi-transparent screen itself, wherein the pickup means produces a pickup signal based on the electromagnetic waves in the second wavelength range reflected back through the semi-transparent screen to; and
    control processing means for generating detection image information corresponding to the input manipulation of the manipulation body based on the pickup signal, and for executing a control process for controlling the display image projected onto the semi-transparent screen.

2. The information input apparatus according to claim 1, wherein the control processing means is so configured as to be able to recognize plural pieces of input manipulation information based on image states of the detection image information and to execute different control processes based on the respective pieces of input manipulation information.

3. The information input apparatus according to claim 1, wherein the control processing means is so configured as to recognize the input manipulation information based on a particular image shape that is obtained as an image state of the detection image information.

4. The information input apparatus according to claim 1, wherein the control processing means is so configured as to be able to recognize a hand or a finger of a human body as a subject of detection of the input manipulation information.

5. The information input apparatus according to claim 1, further comprising projection display means provided so as to be able to project, onto the semi-transparent screen, an image of visible light in an wavelength range excluding the predetermined wavelength range of light or electromagnetic waves to be captured by the pickup means, wherein the control processing means executes, as the control process, a display image generation process for causing the projection display means to project a display image and a control on the projection display means.

6. The information input apparatus according to claim 5, wherein the control processing means is so configured as to be able to generate the display image by using the detection image information.

7. The information input apparatus according to claim 1, wherein the display image includes a menu picture, said control processing means configured such that input manipulations corresponding to one or more items within said menu causing the control processing means to execute a prescribed process.

8. The information input apparatus according to claim 1, wherein an initial image having a predetermined content is set as the display image.

9. The information input apparatus according to claim 8, wherein the control processing means has attribute information relating to an image content of a particular region in the initial image, and wherein when it has been judged that the particular region has been designated as the input manipulation information, the control processing means executes a control process so that the projection display means projects an image indicating the attribute information relating to the designated region.

10. The information input apparatus according to claim 1, wherein the control processing means executes the display image generation process so that the display image is displayed in an area on the semi-transparent screen corresponding to a located position of a physical object on the semi-transparent screen or in a space near the semi-transparent screen.

11. The information input apparatus according to claim 1, wherein the semi-transparent screen is formed by combining a material for forming a transparent screen and a material for forming a semi-transparent screen.

12. The information input apparatus according to claim 1, wherein the semi-transparent screen constitutes a wall surface.

13. The information input apparatus according to claim 1, wherein the semi-transparent screen has a curved surface.

14. The information input apparatus according to claim 1, wherein the semi-transparent screen is disposed so as to constitute a table surface.

15. The information input apparatus according to claim 1, further comprising pointing device means capable of causing a state variation in light or electromagnetic waves in the second wavelength range to be captured by the pickup means by irradiating the semi-transparent screen with electromagnetic waves in the second wavelength range.

16. The information input apparatus according to claim 1, wherein the pickup means comprises a plurality of imaging means for producing imaging signals through photographing with different magnification factors, and wherein the control processing means executes the control process based on the detection image information that is generated based on imaging signals that are supplied from the plurality of imaging means.

17. The information input apparatus according to claim 16, wherein the control processing means selects, according to a predetermined rule, a particular imaging region of an area of detection image information that is obtained based on an imaging signal produced by a predetermined one of the plurality of imaging means, and executes a control so that one of the imaging means that is different from the predetermined imaging means photographs an image in the particular imaging region with a varied magnification factor.

* * * * *